US008067498B2

(12) United States Patent
Yano et al.

(10) Patent No.: US 8,067,498 B2
(45) Date of Patent: Nov. 29, 2011

(54) CURABLE COMPOSITION

(75) Inventors: Ayako Yano, Hyogo (JP); Hitoshi Tamai, Osaka (JP)

(73) Assignee: Kaneka Corporation, Osaka (JP)

( * ) Notice: Subject to any disclaimer, the term of this patent is extended or adjusted under 35 U.S.C. 154(b) by 688 days.

(21) Appl. No.: 11/547,353

(22) PCT Filed: Apr. 4, 2005

(86) PCT No.: PCT/JP2005/006589
§ 371 (c)(1),
(2), (4) Date: Dec. 21, 2007

(87) PCT Pub. No.: WO2005/097909
PCT Pub. Date: Oct. 20, 2005

(65) Prior Publication Data
US 2008/0200613 A1    Aug. 21, 2008

(30) Foreign Application Priority Data

Apr. 5, 2004   (JP) ................................ 2004-111333

(51) Int. Cl.
*C08L 83/00* (2006.01)
*C08F 130/08* (2006.01)
(52) U.S. Cl. ........................................ 525/100; 526/279
(58) Field of Classification Search .................. 525/100; 526/279
See application file for complete search history.

(56) References Cited

U.S. PATENT DOCUMENTS

| 4,748,205 A * | 5/1988 | Katto et al. ................. 525/75 |
| 6,306,966 B1 | 10/2001 | Horie et al. |
| 6,407,146 B1 * | 6/2002 | Fujita et al. ................. 522/99 |
| 2004/0113311 A1 | 6/2004 | Hasegawa et al. |

FOREIGN PATENT DOCUMENTS

| EP | 1 000 980 A1 | 5/2000 |
| EP | 1 371 670 A1 | 12/2003 |
| EP | 1 598 402 | 11/2005 |
| JP | 59-122541 A | 7/1984 |
| JP | 10-205013 A | 8/1998 |
| JP | 11-116763 A | 4/1999 |
| JP | 11-302527 A | 11/1999 |
| JP | 2000-038560 | 2/2000 |
| JP | 2000-38560 A | 2/2000 |
| JP | 2002-80548 A | 3/2002 |
| JP | 2002-294022 | 10/2002 |
| JP | 2002294022 A * | 10/2002 |
| JP | 2002-363361 | 12/2002 |
| JP | 2002-363361 A | 12/2002 |
| JP | 2003-34757 A | 2/2003 |
| JP | 2003034757 A * | 2/2003 |
| JP | 2003-113288 | 4/2003 |
| JP | 2003-113324 | 4/2003 |
| JP | 2003-113324 A | 4/2003 |
| JP | 2004-277751 A | 10/2004 |
| JP | 2004-292621 A | 10/2004 |
| JP | 2004-323843 A | 11/2004 |
| WO | WO 99/05216 A1 | 2/1999 |
| WO | WO 02/068482 A1 | 9/2002 |
| WO | 2004/074381 | 9/2004 |

OTHER PUBLICATIONS

International Preliminary Report on Patentability (Chapter I of the Patent Cooperation Treaty) from Corresponding International Application No. PCT/JP2005/006589, dated Oct. 19, 2006, 4 pages.
International Search Report from Corresponding International Application No. PCT/JP2005/006589, dated May 17, 2005, 2 pages.

* cited by examiner

*Primary Examiner* — Michael M Bernshteyn
(74) *Attorney, Agent, or Firm* — Hamre, Schumann, Mueller & Larson, P.C.

(57) ABSTRACT

The present invention has its object to provide a transparent curable composition which may be prepared as a one package formulation, and which is excellent in strength, elongation at break, weather resistance, and adhesiveness of the resultant cured product.
In addition, the present invention provides a curable composition which comprises 100 parts by weight of a vinyl polymer (I) the main chain of which is the product of living radical polymerization and which contains a crosslinkable silyl group, and 1 to 200 parts by weight of a micronized hydrophobic silica (II). Furthermore, the present invention also provides a curable composition which comprises 100 parts by weight of a vinyl polymer (I) the main chain of which is the product of living radical polymerization and which contains at least one crosslinkable silyl group, and 1 to 200 parts by weight of a graft copolymer (III) obtained by graft polymerization of a crosslinkable rubber-like acrylic ester polymer and a vinyl monomer.

16 Claims, No Drawings

CURABLE COMPOSITION

RELATED APPLICATIONS

This application is a nationalization of PCT application PCT/JP2005/006589 filed on Apr. 4, 2005, claiming priority based on Japanese Application No. 2004-111333 filed on Apr. 5, 2004, the contents of which are incorporated herein by reference in their entirety.

TECHNICAL FIELD

The present invention relates to transparent curable composition which comprises a vinyl polymer (I) the main chain of which is the product of living radical polymerization and which contains at least one crosslinkable silyl group, a micronized hydrophobic silica (II), or a graft copolymer (III) obtained by graft polymerization of a crosslinkable rubber-like acrylic ester polymer and a vinyl monomer.

BACKGROUND ART

Room temperature curable polymers, which are in liquid phase before curing and rubber-like elastic bodies after curing, are used for adhesives, sealing materials, gaskets, and the like. As typical room temperature curable sealing materials, urethane, silicone, modified silicone, polysulfide and the like type sealing materials are known.

The sealing materials are used for various kinds of materials, e.g., glass, metals, construction materials such as stone. In the case where they are used for glass or the like transparent materials, light reaches the interface between glass and the sealing material through the grass and, if the sealing material is low in weather resistance, it is deteriorated and therefore peeling in the interface between the glass and the sealing material is caused. Therefore, the silicone type sealing material, which is excellent in weather resistance, has been used as a sealing material for glass or the like transparent materials. However, the silicon type sealing material has a problem that a silicone compound such as silicone oil bleeds out and pollutes the surroundings of the sealing material.

To solve the above-mentioned problem attributed to the silicone type sealing material, a method is proposed which uses a non-silicone type sealing material such as a modified silicone type sealing material and a polyisobutylene type sealing material having a reactive silyl group in place of the silicone type sealing material (reference to Japanese Kokai Publication Hei-10-205013). Japanese Kokai Publication Hei-10-205013 describes that the polyisobutylene type sealing material having a reactive silyl group is usable as a sealing material for glass or the like transparent materials. However, resin components of the polyisobutylene type sealing material scarcely permeate water, so that the material is difficult to be used as so-called moisture-curing one-component type sealing material.

On the other hand, although having better weather resistance than the urethane type sealing material, the modified silicone type sealing material is insufficient in long-term weather resistance. To improve weather resistance of the modified silicone type sealing material, a method using (meth)acrylic polymers having a crosslinkable silyl group in combination is disclosed (reference to Japanese Kokai Publication Sho-59-122541). The method failed to improve the weather resistance to a sufficient extent to be used for transparent materials, however.

In the case of using the room temperature curable composition for adhesives, sealing materials, gaskets, or the like application, calcium carbonate, talc, clay and/or the like are generally added mainly for the purpose of reinforcement. However, in recent years, buildings with high grade design have been constructed and, in the case where glass, acrylic boards, high-strength polycarbonates and/or the like transparent substrates are used, the sealing material is also required to have good transparency in some cases. Further, in these years, many siding housings using siding boards for the outer walls have been constructed and various colors are employed for the siding boards. The sealing materials to be used for the siding boards are those which are not so much noticeable, and it is preferable to use sealing materials with the same color as that of the siding boards. However, it is not preferred to produce and store as many types of sealing materials corresponding to those of the siding boards. If a semi-transparent sealing material is available, this, in its own, can be used to almost all of boards with various colors and make it possible to avoid vain stock of many kinds of sealing materials. Further, since being used generally for rear faces of substrates, adhesives are not required to be transparent. However, the adhesives come out and ruin the appearance in some cases, and therefore transparent adhesives are desired. To ensure the transparency, fillers mainly composed of calcium carbonate, mentioned above, cannot be used because they make the material opaque and selection of proper fillers is thus needed. In the case where the sealing material is used for glass or the like transparent materials, the interface between the sealing material and transparent material tends to be deteriorated easily by the light though the transparent material and therefore, the sealing material has to be very high in weather resistance. Further, in the case where the sealing material itself is transparent, light reaches even the inside of the sealing material, and therefore the sealing material is required to have further high weather resistance.

With respect to copolymerization products obtained by polymerization of monomers having polymerizable unsaturated bonds and/or macromonomers thereof with reactive silicone monomers and/or macromonomers thereof, in the system where the above mentioned components are soluble, by using an oil-soluble polymerization initiator, a silicone-acrylic random copolymer is disclosed which has a melt-flow rate of 2 to 30 g/10 min. at 230° C. and $3.92 \times 10^5$ Pa load and exhibits a luminous transmission of 90% or higher when determined by absorptiometry before and after molding of the copolymerization products (reference to Japanese Kokai Publication 2002-80548). However, this polymerization cannot realize high elongation at break, which is required for the sealing material to have.

A moisture-curable adhesive composition is disclosed which comprises a polyoxypropylene type modified silicone resin containing an acrylic polymer having a silicon-containing functional group, the curing agent thereof, a micronized hydrophobic silica, and an amino group-containing silane coupling agent (reference to Japanese Kokai Publication 2000-38560). Although this composition is excellent in transparency, the cured product obtained from the composition is insufficient in elongation at break and weather resistance.

Further, another kind of moisture-curable composition is disclosed which comprises 100 parts by weight of a mixture containing a copolymer the molecular chain of which is substantially composed of a (meth)acrylic alkyl ester monomer unit having an alkyl group of 1 to 8 carbon atoms and a (meth)acrylic alkyl ester monomer unit having an alkyl group of 10 or more carbon atoms, said copolymer having a reactive silyl group crosslinkable by hydrolysis, and an oxyalkylene polymer having a reactive silyl group crosslinkable by hydrolysis; and 2 to 300 parts by weight of a micronized hydrophobic silica of a particle size of 0.01 to 300 μm (reference to Japanese Kokai Publication Hei-11-302527). The cured product obtained from the composition is also insufficient in elongation at break and weather resistance.

SUMMARY OF THE INVENTION

The problem which the invention is to solve is to provide a transparent curable composition and a sealing material excellent in weather resistance, adhesiveness, strength, and elongation at break.

The present inventors found the following invention will overcome the above-mentioned problems.

[1] A curable composition
which comprises 100 parts by weight of a vinyl polymer (I) the main chain of which is the product of living radical polymerization and which contains at least one crosslinkable silyl group, and 1 to 200 parts by weight of a micronized hydrophobic silica (II).

[2] A curable composition
which comprises 100 parts by weight of a vinyl polymer (I) the main chain of which is the product of living radical polymerization and which contains at least one crosslinkable silyl group, and 1 to 200 parts by weight of a graft copolymer (III) obtained by graft polymerization of a crosslinkable rubber-like acrylic ester polymer and a vinyl monomer.

[3] The curable composition according to [1] or [2]
wherein the vinyl polymer (I) has a molecular weight distribution of less than 1.8.

[4] The curable composition according to any one of [1] to [3]
wherein a vinyl monomer constituting the main chain of the vinyl polymer (I) is mainly selected from the group consisting of (meth)acrylic monomers, acrylonitrile monomers, aromatic vinyl monomers, fluorine-containing vinyl monomers and silicon-containing vinyl monomers.

[5] The curable composition according to any one of [1] to [4]
wherein the main chain of the vinyl polymer (I) is a (meth)acrylic polymer.

[6] The curable composition according to any one of [1] to [5]
wherein the main chain of the vinyl polymer (I) is an acrylic polymer.

[7] The curable composition according to [6]
wherein the main chain of the vinyl polymer (I) is an acrylic ester polymer.

[8] The curable composition according to any one of [1] to [7]
wherein the living radical polymerization for producing the main chain of the vinyl polymer (I) is the atom transfer radical polymerization.

[9] The curable composition according to [8]
wherein a transition metal complex used as the catalyst in the atom transfer radical polymerization is one composed of a VII, VIII, IX, X, or XI group element in the periodic table as a central metal.

[10] The curable composition according to [9]
wherein the metal complex used as the catalyst is a complex composed of copper, nickel, ruthenium or iron as a central metal.

[11] The curable composition according to [10]
wherein the metal complex used as the catalyst is a complex of copper.

[12] The curable composition according to any one of [1] to [11]
wherein the crosslinkable silyl group of the vinyl polymer (I) is represented by the general formula 1:

{wherein, $R^1$ and $R^2$ are the same or different and each is an alkyl group containing 1 to 20 carbon atoms, an aryl group containing 6 to 20 carbon atoms, an aralkyl group containing 7 to 20 carbon atoms or a triorganosiloxy group represented by $(R')_3SiO-$ (in which R' represents a univalent hydrocarbon group containing 1 to 20 carbon atoms and the three R' groups may be the same or different) and, when there are two or more $R^1$ or $R^2$ groups, they may be the same or different; Y represents a hydroxyl group or a hydrolyzable group and, when there are two or more Y groups, they may be the same or different; a represents 0, 1, 2 or 3, b represents 0, 1 or 2, and l represents an integer of 0 to 19, provided that the relation $a+lb \geq 1$ should be satisfied.}

[13] The curable composition according to any one of [1] to [12]
wherein the crosslinkable silyl group of the vinyl polymer (I) is at the terminus of the main chain.

[14] A curable composition
wherein the micronized hydrophobic silica (II) has a particle diameter of not greater than 0.02 μm.

[15] The curable composition according to any one of [1] to [14]
which further comprises a polyoxyalkylene polymer (IV) containing at least one crosslinkable silyl group in an amount within the range of 0.1 to 1,000 parts by weight per 100 parts by weight of the vinyl polymer (I).

[16] The curable composition according to any one of [1] to [14]
which comprises no polyoxyalkylene polymer (IV) containing a crosslinkable silyl group(s).

[17] The curable composition according to any one of [1] to [16]
which further comprises 0.1 to 20 parts by weight of a tin curing catalyst (V) per 100 parts by weight of the vinyl polymer (I).

[18] An adhesive
which comprises the curable composition according to any one of [1] to [17].

[19] A sealing material
which comprises the curable composition according to any one of [1] to [17].

[20] A liquid gasket
which comprises the curable composition according to any one of [1] to [17].

[21] A coating material
which comprises the curable composition according to any one of [1] to [17].

Namely, the present invention relates to a curable composition which comprises a vinyl polymer (I) the main chain of which is the product of living radical polymerization and which contains at least one crosslinkable silyl group, a micronized hydrophobic silica (II), and a graft copolymer (III) obtained by graft polymerization of a crosslinkable rubber-like acrylic ester polymer and a vinyl monomer.

The term "crosslinkable silyl group" as used herein means a silicon-containing group containing a hydroxyl or hydrolysable group bound to a silicon atom and capable of being crosslinked under formation of a siloxane bond.

The curable composition of the invention may be prepared as a one package formulation, which can be cured by the reaction with the moisture in the air at room temperature, and is a transparent curable composition excellent in strength, elongation at break, weather resistance, and adhesiveness of the resultant cured product. Further, said curable composition can be suitably used as a transparent adhesive, sealing material and the like.

DETAILED DESCRIPTION OF THE INVENTION

In the following, the curable composition of the invention is described in detail.
<<Vinyl Polymer (I) Whose Main Chain is a Product of Living Radical Polymerization>>
<Main Chain>
A vinyl monomer which constitutes the main chain of vinyl polymer (I) of the present invention is not particularly limited, and any of various monomers can be used. Examples of the vinyl monomer include (meth)acrylic acid monomers, such as (meth)acrylic acid, methyl(meth)acrylate, ethyl(meth)acrylate, n-propyl(meth)acrylate, isopropyl(meth)acrylate, n-butyl(meth)acrylate, isobutyl(meth)acrylate, tert-butyl (meth)acrylate, n-pentyl(meth)acrylate, n-hexyl(meth)acrylate, cyclohexyl(meth)acrylate, n-heptyl(meth)acrylate, n-octyl(meth)acrylate, 2-ethylhexyl(meth)acrylate, nonyl (meth)acrylate, decyl(meth)acrylate, dodecyl(meth)acrylate, phenyl(meth)acrylate, tolyl(meth)acrylate, benzyl(meth)acrylate, 2-methoxyethyl(meth)acrylate, 3-methoxybutyl (meth)acrylate, 2-hydroxyethyl(meth)acrylate, 2-hydroxypropyl(meth)acrylate, stearyl(meth)acrylate, glycidyl (meth)acrylate, 2-aminoethyl(meth)acrylate, γ-(methacryloyloxypropyl)trimethoxysilane, ethylene oxide adduct of (meth)acrylic acid, trifluoromethylmethyl(meth)acrylate, 2-trifluoromethylethyl(meth)acrylate, 2-perfluoroethylethyl(meth)acrylate, 2-perfluoroethyl-2-perfluorobutylethyl(meth)acrylate, 2-perfluoroethyl(meth)acrylate, perfluoromethyl(meth)acrylate, diperfluoromethylmethyl (meth)acrylate, 2-perfluoromethyl-2-perfluoroethylmethyl (meth)acrylate, 2-perfluorohexylethyl(meth)acrylate, 2-perfluorodecylethyl(meth)acrylate, and 2-perfluorohexadecylethyl(meth)acrylate; aromatic vinyl monomers, such as styrene, vinyltoluene, α-methylstyrene, chlorostyrene, and styrenesulfonic acid and its salts; fluorine-containing vinyl monomers, such as perfluoroethylene, perfluoropropylene, and vinylidene fluoride; silicon-containing vinyl monomers, such as vinyltrimethoxysilane and vinyltriethoxysilane; maleic anhydride, maleic acid, and monoalkyl esters and dialkyl esters of maleic acid; fumaric acid and monoalkyl and dialkyl esters of fumaric acid; maleimide monomers, such as, maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; acrylonitrile monomers, such as acrylonitrile and methacrylonitrile; amido-containing vinyl monomers, such as acrylamide and methacrylamide; vinyl esters, such as vinyl acetate, vinyl propionate, vinyl pivalate, vinyl benzoate, and vinyl cinnamate; alkenes, such as ethylene and propylene; conjugated dienes, such as butadiene and isoprene; and vinyl chloride, vinylidene chloride, allyl chloride, and allyl alcohol. These compounds may be used alone, or at least two may be copolymerized.

The main chain of the vinyl polymer (I) is preferably one produced by polymerizing predominantly at least one monomer selected from the group consisting of (meth)acrylic monomers, acrylonitrile monomers, aromatic vinyl monomers, fluorine-containing vinyl monomers and silicon-containing vinyl monomers. The term "predominantly" as used herein means that the above-mentioned monomer accounts for not less than 50 mole percent, preferably not less than 70 mole percent, of the monomer units constituting the vinyl polymer (I).

In particular, from the viewpoint of physical properties of a product, styrene monomers and (meth)acrylic monomers are preferred. Acrylate monomers and methacrylate monomers are more preferred, acrylate monomers are further preferred, and butyl acrylate is further more preferred. In the present invention, these preferred monomers may be copolymerized, e.g., block-copolymerized, with another monomer. In this case, the content by weight of the preferred monomers is preferably 40% by weight or more. In the above expression, for example, the term "(meth)acrylic acid" means acrylic acid and/or methacrylic acid.

In those fields of application where rubber elasticity is required, the vinyl polymer (I) preferably has a glass transition temperature of room temperature or lower than the expected use temperature range, although this is not critical.

The molecular weight distribution [ratio (Mw/Mn) of the weight average molecular weight (Mw) to the number average molecular weight (Mn) determined by gel permeation chromatography (GPC)] of vinyl polymer (I) of the present invention is not particularly limited, but the ratio is preferably less than 1.8, further preferably 1.6 or less, and particularly preferably 1.3 or less. In GPC measurement in the present invention, a number average molecular weight and the like may be generally determined in terms of polystyrene using chloroform as a mobile phase and a polystyrene gel column for measurement.

The number average molecular weight of vinyl polymer (I) of the present invention is not particularly restricted, and preferably in a range of 500 to 1,000,000 and more preferably 5,000 to 50,000 with gel permeation chromatography.
<Method of Main Chain Synthesis>
In accordance with the invention, the method of synthesizing the vinyl polymer (I) is limited to a living radical polymerization technique among controlled radical polymerization techniques, and the atom transfer radical polymerization technique is preferred. This technique is described below.
Controlled Radical Polymerization Radical polymerization processes are classified into a general radical polymerization process (free radical polymerization) in which a monomer having a specified functional group and a vinyl monomer are simply copolymerized using an azo compound, a peroxide, or the like as a polymerization initiator, and a controlled radial polymerization process in which a specified functional group can be introduced at a controlled position such as an end or the like.

The general radical polymerization process is a simple process, and a monomer having a specified functional group can be introduced into a polymer only stochastically. When a polymer with high functionality is desired, therefore, a considerable amount of a monomer must be used. Conversely, use of a small amount of a monomer has the problem of increasing the ratio of a polymer in which the specified functional group is not introduced. There is also the problem of producing only a polymer with a wide molecular weight distribution and high viscosity due to free radical polymerization.

The controlled radical polymerization process is further classified into a chain transfer agent process in which polymerization is performed using a chain transfer agent having a specified functional group to produce a vinyl polymer having the functional group at an end, and a living radical polymerization process in which polymerization propagation termini propagate without causing termination reaction or the like to produce a polymer having a molecular weight substantially equal to the design.

The chain transfer agent process is capable of producing a polymer with high functionality, but a considerable amount of a chain transfer agent having a specified functional group must be used relative to the initiator, thereby causing an economical problem of the cost including the treatment cost. Like the general radical polymerization process, the chain transfer agent process also has the problem of producing only a polymer with a wide molecular weight distribution and high viscosity because it is free radical polymerization.

It is true that the living radical polymer process belongs to a radical polymerization process which has a high polymerization rate and is difficult to control because termination reaction easily occurs due to radical coupling or the like. However, unlike in the above-mentioned processes, in the living radical polymerization process, termination reaction little occurs, a polymer having a narrow molecular weight distribution (Mw/Mn of about 1.1 to 1.5) can be produced, and the molecular weight can be freely controlled by changing the charge ratio of the monomer to the initiator.

Therefore, the living radical polymerization process is capable of producing a polymer with a narrow molecular weight distribution and low viscosity and introducing a monomer having a specified functional group into a substantially desired position. Thus, this process is more preferred as a process for producing the vinyl polymer having the specified functional group.

In a narrow sense, "living polymerization" means polymerization in which molecular chains propagate while maintaining activity at the termini. However, the living polymerization generally includes pseudo-living polymerization in which molecular chains propagate in equilibrium between deactivated and activated termini. The definition in the present invention includes the latter.

In recent, the living radical polymerization has been actively studied by various groups. Examples of studies include a process using a cobalt porphyrin complex, as shown in Journal of American Chemical Society (J. Am. Chem. Soc.), 1994, vol. 116, p. 7943, a process using a radical capping agent such as a nitroxide compound, as shown in Macromolecules, 1994, vol. 27, p. 7228, and an atom transfer radical polymerization (ATRP) process using an organic halide or the like as an initiator and a transition metal complex as a catalyst.

Among these living radical polymerization processes, the atom transfer radical polymerization process in which a vinyl monomer is polymerized using an organic halide or a halogenated sulfonyl compound as an initiator and a transition metal complex as a catalyst has the above-mentioned characteristics of the living radical polymerization and also has the characteristic that a terminus has a halogen or the like, which is relatively useful for functional group conversion reaction, and the initiator and catalyst have high degrees of design freedom. Therefore, the atom transfer radical polymerization process is more preferred as a process for producing a vinyl polymer having a specified functional group. Examples of the atom transfer radical polymerization process include the processes disclosed in Matyjaszewski, et al., Journal of American Chemical Society (J. Am. Chem. Soc.), 1995, vol. 117, p. 5614, Macromolecules, 1995, vol. 28, p. 7901, Science, 1996, vol. 272, p. 866, WO96/30421, WO97/18247, WO98/01480 and WO98/40415, Sawamoto, et al., Macromolecules, 1995, vol. 28, p. 1721, and Japanese Kokai Publication Hei-09-208616 and Japanese Kokai Publication Hei-08-41117.

In the present invention, any one of these living radical polymerization processes may be used without limitation, but the atom transfer radical polymerization process is preferred.

Hereinafter, the living radical polymerization will be described in detail. First, the controlled radical polymerization process using a chain transfer agent, which may be used in the production of the vinyl polymers mentioned below, will be described. The radical polymerization process using the chain transfer agent (telomer) is not particularly limited, but examples of a process for producing a vinyl polymer having a terminal structure suitable for the present invention include the following two processes:

A process for producing a halogen-terminated polymer using a halogenated hydrocarbon as the chain transfer agent as disclosed in Japanese Kokai Publication Hei-04-132706, and a method for producing a hydroxyl group-terminated polymer using a hydroxyl group-containing mercaptane or a hydroxyl group-containing polysulfide or the like as the chain transfer agent as disclosed in Japanese Kokai Publication Sho-61-271306, Japanese Patent Publication No. 2594402, and Japanese Kokai Publication Sho-54-47782.

Next, the living radical polymerization will be described.

First, the process using a nitroxide compound and the like as a radical capping agent will be described. This polymerization process generally uses stable nitroxy free radical (=N—O.) as a radical capping agent. Preferred examples of such a compound include, but not limited to, nitroxy free radicals produced from cyclic hydroxyamines, such as 2,2,6,6-substituted-1-piperidinyloxy radical and 2,2,5,5-substituted-1-piperidinyloxy radical. As a substituent, an alkyl group having 4 or less carbon atoms, such as methyl or ethyl, is suitable. Specific examples of a nitroxy free radical compound include, but not limited to, 2,2,6,6-tetramethyl-1-piperidinyloxy radical (TEMPO), 2,2,6,6-tetraethyl-1-piperidinyloxy radical, 2,2,6,6-tetramethyl-4-oxo-1-piperidinyloxy radical, 2,2,5,5-tetramethyl-1-pyrrolidinyloxy radical, 1,1,3,3-tetramethyl-2-isoindolinyloxy radical, and N,N-di-tert-butylaminoxy radical. Instead of the nitroxy free radical, stable free radical such as galvinoxyl free radical may be used.

The radical capping agent is used in combination with the radical generator. The reaction product of the radical capping agent and the radical generator possibly servers as a polymerization initiator to promote polymerization of an addition-polymerizable monomer. The ratio between both agents used is not particularly limited, but the amount of the radical generator is preferably 0.1 to 10 moles per mole of the radical capping agent.

As a radical generator, any one of various compounds can be used, but a peroxide capable of generating radical under a polymerization temperature is preferred. Examples of the peroxide include, but not limited to, diacyl peroxides, such as benzoyl peroxide and lauroyl peroxide; dialkyl peroxides, such as dicumyl peroxide and di-tert-butyl peroxide; peroxycarbonates, such as diisopropyl peroxydicarbonate and bis(4-tert-butylcyclohexyl)peroxydicarbonate; and alkyl peresters, such as tert-butyl peroxyoctoate and tert-butyl peroxybenzoate. In particular, benzoyl peroxide is preferred. Instead of the peroxide, a radical generator such as a radical generating azo compound, e.g., azobisisobutyronitrile, may be used.

As reported in Macromolecules, 1995, 28, 2993, the alkoxyamine compound shown below may be used as the initiator instead of a combination of the radical capping agent and the radical generator.

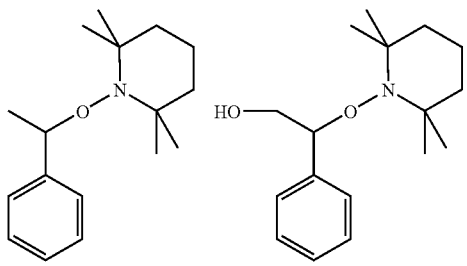

When the alkoxyamine compound is used as the initiator, the use of a compound having a functional group such as a hydroxyl group as shown in the above figure produces a polymer having the functional group at an end. When this compound is used in the method of the present invention, a polymer having the functional group at an end is produced.

The conditions of polymerization using the nitroxide compound and/or the like as the radical capping agent, such as the monomer, the solvent, the polymerization temperature, and the like, are not limited. However, these conditions may be the same as those in atom transfer radical polymerization which will be described below.

Atom Transfer Radical Polymerization

Next, the atom transfer radical polymerization suitable as the living radical polymerization of the present invention will be described.

The atom transfer radical polymerization uses, as the initiator, an organic halide, particularly an organic halide having a highly reactive carbon-halogen bond (e.g., a carbonyl compound having a halogen at an α-position, or a compound having a halogen at a benzyl position), or a halogenated sulfonyl compound.

Specific examples of such a compound include the following:
$C_6H_5$—$CH_2X$, $C_6H_5$—$C(H)(X)CH_3$, and $C_6H_5$—$C(X)(CH_3)_2$
(wherein $C_6H_5$ is a phenyl group, X is chlorine, bromine, or iodine);
$R^3$—$C(H)(X)$—$CO_2R^4$, $R^3$—$C(CH_3)(X)$—$CO_2R^4$, $R^3$—$C(H)(X)$—$C(O)R^4$, and $R^3$—$C(CH_3)(X)$—$C(O)R^4$
(wherein $R^3$ and $R^4$ each is a hydrogen atom or an alkyl group, an aryl group, or an aralkyl group having 1 to 20 carbon atoms; X is chlorine, bromine, or iodine); and
$R^3$—$C_6H_4$—$SO_2X$
(wherein $R^3$ is a hydrogen atom or an alkyl group, an aryl group, or an aralkyl group having 1 to 20 carbon atoms; X is chlorine, bromine, or iodine).

As the initiator of the atom transfer radical polymerization, an organic halide or halogenated sulfonyl compound having a functional group other than a functional group which initiates polymerization can be used. In this case, the resultant vinyl polymer has the functional group at one of the main chain ends and a polymerization propagation terminal-structure of atom transfer radical polymerization at the other end. Examples of such a functional group include alkenyl, crosslinkable silyl, hydroxyl, epoxy, amino, and amido group.

Examples of an organic halide having an alkenyl group include, but not limited to, compounds having the structure represented by the general formula 2:

$R^6R^7C(X)$—$R^8$—$R^9$—$C(R^5)$=$CH_2$ (2)

(wherein $R^5$ is a hydrogen atom or a methyl group; $R^6$ and $R^7$ each is a hydrogen atom, an alkyl group, an aryl group or an aralkyl group having 1 to 20 carbon atoms, or $R^6$ and $R^7$ are bonded together at the other ends; $R^8$ is —C(O)O— (ester group), —C(O)— (keto group), or an o-, m-, or p-phenylene group; $R^9$ is a direct bond or a divalent organic group having 1 to 20 carbon atoms, which may contain at least one ether bond; and X is chlorine, bromine, or iodine).

Specific examples of substituents $R^6$ and $R^7$ include hydrogen, methyl, ethyl, n-propyl, isopropyl, butyl, pentyl, and hexyl group. Substituents $R^6$ and $R^7$ may be bonded together at the other ends to form a cyclic skeleton.

Specific examples of an alkenyl group-containing organic halide represented by the general formula 2 are the following:
$XCH_2C(O)O(CH_2)_nCH$=$CH_2$,
$H_3CC(H)(X)C(O)O(CH_2)_nCH$=$CH_2$,
$(H_3C)_2C(X)C(O)O(CH_2)_nCH$=$CH_2$,
$CH_3CH_2C(H)(X)C(O)O(CH_2)_nCH$=$CH_2$, and

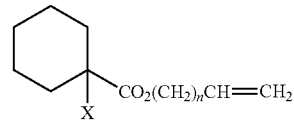

(wherein X is chlorine, bromine, or iodine, and n is an integer of 0 to 20);
$XCH_2C(O)O(CH_2)_nO(CH_2)_mCH$=$CH_2$,
$H_3CC(H)(X)C(O)O(CH_2)_nO(CH_2)_mCH$=$CH_2$,
$(H_3C)_2C(X)C(O)O(CH_2)_nO(CH_2)_mCH$=$CH_2$,
$CH_3CH_2C(H)(X)C(O)O(CH_2)_nO(CH_2)_mCH$=$CH_2$, and

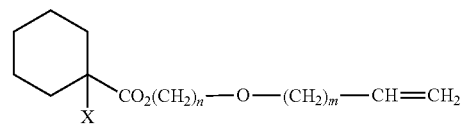

(wherein X is chlorine, bromine, or iodine, n is an integer of 0 to 20, and m is an integer of 1 to 20);
o, m, p-$XCH_2$—$C_6H_4$—$(CH_2)_n$—$CH$=$CH_2$,
o, m, p-$CH_3C(H)(X)$—$C_6H_4$—$(CH_2)_n$—$CH$=$CH_2$, and
o, m, p-$CH_3CH_2C(H)(X)$—$C_6H_4$—$(CH_2)_n$—$CH$=$CH_2$
(wherein X is chlorine, bromine, or iodine, and n is an integer of 0 to 20);
o, m, p-$XCH_2$—$C_6H_4$—$(CH_2)_n$—O—$(CH_2)_m$—$CH$=$CH_2$,
o, m, p-$CH_3C(H)(X)$—$C_6H_4$—$(CH_2)_n$—O—$(CH_2)_m$—$CH$=$CH_2$ and
o, m, p-$CH_3CH_2C(H)(X)$—$C_6H_4$—$(CH_2)_n$—O—$(CH_2)_m$—$CH$=$CH_2$
(wherein X is chlorine, bromine, or iodine, n is an integer of 0 to 20, and m is an integer of 1 to 20);
o, m, p-$XCH_2$—$C_6H_4$—O—$(CH_2)_n$—$CH$=$CH_2$,
o, m, p-$CH_3C(H)(X)$—$C_6H_4$—O—$(CH_2)_n$—$CH$=$CH_2$, and
o, m, p-$CH_3CH_2C(H)(X)$—$C_6H_4$—O—$(CH_2)_n$—$CH$=$CH_2$
(wherein X is chlorine, bromine, or iodine, and n is an integer of 0 to 20); and
o, m, p-$XCH_2$—$C_6H_4$—O—$(CH_2)_n$—O—$(CH_2)_m$—$CH$=$CH_2$,
o, m, p-$CH_3C(H)(X)$—$C_6H_4$—O—$(CH_2)_n$—O—$(CH_2)_m$—$CH$=$CH_2$, and
o, m, p-$CH_3CH_2C(H)(X)$—$C_6H_4$—O—$(CH_2)_n$—O—$(CH_2)$—$CH$=$CH_2$
(wherein X is chlorine, bromine, or iodine, n is an integer of 0 to 20, and m is an integer of 1 to 20).

Other examples of an organic halide having an alkenyl group include compounds represented by the general formula 3:

$$H_2C=C(R^5)-R^9-C(R^6)(X)-R^{10}-R^7 \quad (3)$$

(wherein $R^5$, $R^6$, $R^7$, $R^9$, and X represent the same as the above, and $R^{10}$ represents a direct bond or —C(O)O— (ester group), —C(O)— (keto group), or an o-, m-, or p-phenylene group).

$R^9$ is a direct bond or a divalent organic group having 1 to 20 carbon atoms (which may contain at least one ether bond). When $R^9$ is a direct bond, the compound is a halogenated allyl compound in which a vinyl group is bonded to the carbon bonded to a halogen. In this case, the carbon-halogen bond is activated by the adjacent vinyl group, and thus a C(O)O or phenylene group is not necessarily required as $R^{10}$, and a direct bond may be present. When $R^9$ is not a direct bond, $R^{10}$ is preferably a C(O)O, C(O), or phenylene group for activating the carbon-halogen bond.

Specific examples of the compounds represented by the general formula 3 include the following:
$CH_2=CHCH_2X$, $CH_2=C(CH_3)CH_2X$, $CH_2=CHC(H)(X)CH_3$,
$CH_2=C(CH_3)C(H)(X)CH_3$, $CH_2=CHC(X)(CH_3)_2$,
$CH_2=CHC(H)(X)C_2H_5$,
$CH_2=CHC(H)(X)CH(CH_3)_2$, $CH_2=CHC(H)(X)C_6H_5$,
$CH_2=CHC(H)(X)CH_2C_6H_5$,
$CH_2=CHCH_2C(H)(X)-CO_2R^{11}$, $CH_2=CH(CH_2)_2C(H)(X)-CO_2R^{11}$,
$CH_2=CH(CH_2)_3C(H)(X)-CO_2R^{11}$, $CH_2=CH(CH_2)_8C(H)(X)-CO_2R^{11}$,
$CH_2=CHCH_2C(H)(X)-C_6H_5$, $CH_2=CH(CH_2)_2C(H)(X)-C_6H_5$, and
$CH_2=CH(CH_2)_3C(H)(X)-C_6H_5$ (wherein X is chlorine, bromine, or iodine, and $R^{11}$ is an alkyl, aryl, or aralkyl group having 1 to 20 carbon atoms).

Specific examples of a halogenated sulfonyl compound having an alkenyl group include the following:
o-, m-, p-$CH_2=CH-(CH_2)_n-C_6H_4-SO_2X$, and
o-, m-, p-$CH_2=CH-(CH_2)_n-O-C_6H_4-SO_2X$
(wherein X is chlorine, bromine, or iodine, and n is an integer of 0 to 20).

Specific examples of an organic halide having a crosslinkable silyl group include, but not limited to, compounds with a structure represented by the general formula 4:

$$R^6R^7C(X)-R^8-R^9-C(H)(R^5)CH_2-[Si(R^1)_{2-b}(Y)_bO]_l-Si(R^2)_{3-a}(Y)_a \quad (4)$$

(wherein $R^5$, $R^6$, $R^7$, $R^8$, $R^9$ and X represent the same as the above, and $R^1$ and $R^2$ are the same or different and each represents an alkyl group having 1 to 20 carbon atoms, an aryl group having 6 to 20 carbon atoms, or an aralkyl group having 7 to 20 carbon atoms, or a triorganosiloxy group represented by $(R')_3SiO$— (the three R's each is a monovalent hydrocarbon group having 1 to 20 carbon atoms and may be the same or different; when two or more groups $R^1$ or $R^2$ are present, they may be the same or different; Y represents a hydroxyl group or a hydrolyzable group, and when two or more groups Y are present, they may be the same or different; a represents 0, 1, 2, or 3; b represents 0, 1, or 2; l represents an integer of 0 to 19; and a+lb≧1 is satisfied).

Specific examples of the compounds represented by the general formula 4 include the following:
$XCH_2C(O)O(CH_2)_nSi(OCH_3)_3$,
$CH_3C(H)(X)C(O)O(CH_2)_nSi(OCH_3)_3$,
$(CH_3)_2C(X)C(O)O(CH_2)_nSi(OCH_3)_3$,
$XCH_2C(O)O(CH_2)_nSi(CH_3)(OCH_3)_2$,
$CH_3C(H)(X)C(O)O(CH_2)_nSi(CH_3)(OCH_3)_2$, and
$(CH_3)_2C(X)C(O)O(CH_2)_nSi(CH_3)(OCH_3)_2$
(wherein X is chlorine, bromine, or iodine, and n is an integer of 0 to 20);

$XCH_2C(O)O(CH_2)_nO(CH_2)_mSi(OCH_3)_3$,
$H_3CC(H)(X)C(O)O(CH_2)_nO(CH_2)_mSi(OCH_3)_3$,
$(H_3C)_2C(X)C(O)O(CH_2)_nO(CH_2)_mSi(OCH_3)_3$,
$CH_3CH_2C(H)(X)C(O)O(CH_2)_nO(CH_2)_mSi(OCH_3)_3$,
$XCH_2C(O)O(CH_2)_nO(CH_2)_mSi(CH_3)(OCH_3)_2$,
$H_3CC(H)(X)C(O)O(CH_2)_nO(CH_2)_m-Si(CH_3)(OCH_3)_2$,
$(H_3C)_2C(X)C(O)O(CH_2)_nO(CH_2)_m-Si(CH_3)(OCH_3)_2$, and
$CH_3CH_2C(H)(X)C(O)O(CH_2)_n(CH_2)_m-Si(CH_3)(OCH_3)_2$,
(wherein X is chlorine, bromine, or iodine, n is an integer of 0 to 20, and m is an integer of 1 to 20); and o, m, p-$XCH_2-C_6H_4-(CH_2)_2Si(OCH_3)_3$,
o, m, p-$CH_3C(H)(X)-C_6H_4-(CH_2)_2Si(OCH_3)_3$,
o, m, p-$CH_3CH_2C(H)(X)-C_6H_4-(CH_2)_2Si(OCH_3)_3$,
o, m, p-$XCH_2-C_6H_4-(CH_2)_3Si(OCH_3)_3$,
o, m, p-$CH_3C(H)(X)-C_6H_4-(CH_2)_3Si(OCH_3)_3$,
o, m, p-$CH_3CH_2C(H)(X)-C_6H_4-(CH_2)_3Si(OCH_3)_3$,
o, m, p-$XCH_2-C_6H_4-(CH_2)_2-O-(CH_2)_3Si(OCH_3)_3$,
o, m, p-$CH_3C(H)(X)-C_6H_4-(CH_2)_2-O-(CH_2)_3Si(OCH_3)_3$,
o, m, p-$CH_3CH_2C(H)(X)-C_6H_4-(CH_2)_2-O-(CH_2)_3Si(OCH_3)_3$,
o, m, p-$XCH_2-C_6H_4-O-(CH_2)_3Si(OCH_3)_3$,
o, m, p-$CH_3C(H)(X)-C_6H_4-O-(CH_2)_3Si(OCH_3)_3$,
o, m, p-$CH_3CH_2C(H)(X)-C_6H_4-O-(CH_2)_3-Si(OCH_3)_3$,
o, m, p-$XCH_2-C_6H_4-O-(CH_2)_2-O-(CH_2)_3-Si(OCH_3)_3$,
o, m, p-$CH_3C(H)(X)-C_6H_4-O-(CH_2)_2-O-(CH_2)_3Si(OCH_3)_3$, and
o, m, p-$CH_3CH_2C(H)(X)-C_6H_4-O-(CH_2)_2-O-(CH_2)_3Si(OCH_3)_3$
(wherein X is chlorine, bromine, or iodine).

Other examples of the organic halide having a crosslinkable silyl group include compounds with a structure represented by the general formula 5:

$$(R^2)_{3-a}(Y)_aSi-[OSi(R^1)_{2-b}(Y)_b]_l-CH_2-C(H)(R^5)-R^9-C(R^6)(X)-R^{10}-R^7 \quad (5)$$

(wherein $R^5$, $R^6$, $R^7$, $R^9$, $R^{10}$, $R^{11}$, $R^{12}$, a, b, l, X and Y represent the same as the above; and a+lb≧1 is satisfied).

Specific examples of such compounds include the following:
$(CH_3O)_3SiCH_2CH_2C(H)(X)C_6H_5$,
$(CH_3O)_2(CH_3)SiCH_2CH_2C(H)(X)C_6H_5$,
$(CH_3O)_3Si(CH_2)_2C(H)(X)-CO_2R^{11}$,
$(CH_3O)_2(CH_3)Si(CH_2)_2C(H)(X)-CO_2R^{11}$,
$(CH_3O)_3Si(CH_2)_3C(H)(X)-CO_2R^{11}$,
$(CH_3O)_2(CH_3)Si(CH_2)_3C(H)(X)-CO_2R^{11}$,
$(CH_3O)_3Si(CH_2)_4C(H)(X)-CO_2R^{11}$,
$(CH_3O)_2(CH_3)Si(CH_2)_4C(H)(X)-CO_2R^{11}$,
$(CH_3O)_3Si(CH_2)_9C(H)(X)-CO_2R^{11}$,
$(CH_3O)_2(CH_3)Si(CH_2)_9C(H)-(X)CO_2R^{11}$,
$(CH_3O)_3Si(CH_2)_3C(H)(X)-C_6H_5$,
$(CH_3O)_2(CH_3)Si(CH_2)_3C(H)(X)-C_6H_5$,
$(CH_3O)_3Si(CH_2)_4C(H)(X)-C_6H_5$, and
$(CH_3O)_2(CH_3)Si(CH_2)_4C(H)(X)-C_6H_5$
(wherein X is chlorine, bromine, or iodine, and $R^{11}$ is alkyl, aryl, or aralkyl group having 1 to 20 carbon atoms).

Examples of the hydroxyl group-containing organic halide or halogenated sulfonyl compound include, but not limited to, the following:

HO—(CH$_2$)$_m$—OC(O)C(H)(R$^3$)(X)

(wherein X is chlorine, bromine, or iodine, R$^3$ is a hydrogen atom or alkyl, aryl, or aralkyl group having 1 to 20 carbon atoms, and m is an integer of 1 to 20).

Examples of the amino group-containing organic halide or halogenated sulfonyl compound include, but not limited to, the following:

H$_2$N—(CH$_2$)$_m$—OC(O)C(H)(R$^3$)(X)

(wherein X is chlorine, bromine, or iodine, R$^3$ is a hydrogen atom or alkyl, aryl, or aralkyl group having 1 to 20 carbon atoms, and m is an integer of 1 to 20).

Examples of the epoxy group-containing organic halide or halogenated sulfonyl compound include, but not limited to, the following:

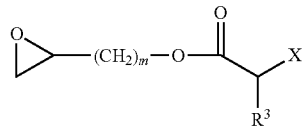

(wherein X is chlorine, bromine, or iodine, R$^3$ is a hydrogen atom or alkyl, aryl, or aralkyl group having 1 to 20 carbon atoms, and m is an integer of 1 to 20).

In order to obtain a polymer having at least two polymerization propagation terminal structures per molecule, an organic halide or halogenated sulfonyl compound having at least two initiation points is preferably used as the initiator. Examples of such a compound include the following:

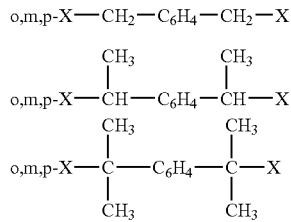

(wherein C$_6$H$_4$ is a phenylene group, and X is chlorine, bromine, or iodine.)

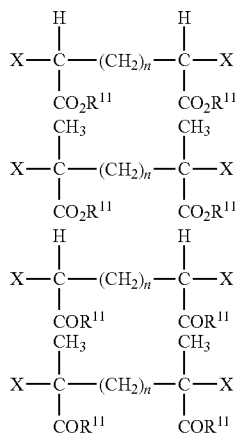

(wherein R$^{11}$ is an alkyl, aryl, or aralkyl group having 1 to 20 carbon atoms, n is an integer of 0 to 20, and X is chlorine, bromine, or iodine.)

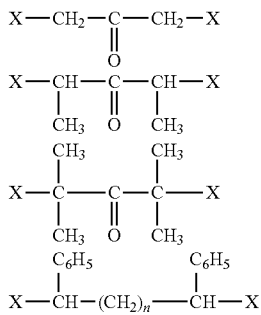

(wherein X is chlorine, bromine, or iodine, and n is an integer of 0 to 20.)

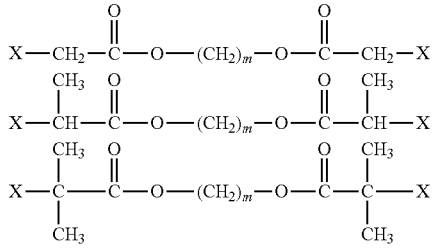

(wherein m is an integer of 1 to 20, and X is chlorine, bromine, or iodine.)

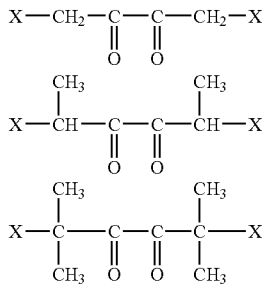

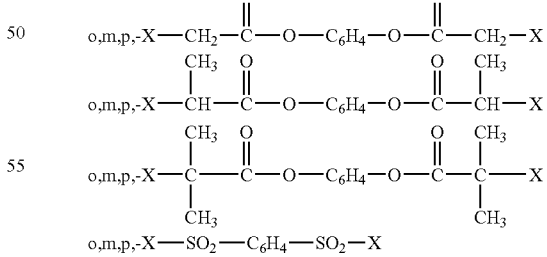

(wherein X is chlorine, bromine, or iodine.)

The vinyl monomer used in the polymerization is not particularly limited, and any of the compounds listed above can be preferably used.

The transition metal complex used as the polymerization catalyst is not particularly limited, but a metal complex composed of a VII, VIII, IX, X, or XI group element in the periodic table as a central metal is preferred. A complex of zero-valent copper, monovalent copper, divalent ruthenium, divalent iron, or divalent nickel is more preferred. Among these complexes, a copper complex is most preferred. Specific examples of a monovalent copper compound include cuprous chloride, cuprous bromide, cuprous iodide, cuprous cyanide, cuprous oxide, and cuprous perchlorate. When a copper compound is used, a ligand, such as 2,2'-bipyridyl or its derivative, 1,10-phenanthroline or its derivative, or polyamine, e.g., tetramethylethylenediamine, pentamethyldiethylenetriamine, or hexamethyl tris(2-aminoethyl) amine, is added for increasing catalyst activity. As a ligand, nitrogen-containing compounds are preferred, chelate nitrogen compounds are more preferred, N,N,N',N'',N''-pentamethyldiethylenetriamine is further preferred. Also, a tristriphenylphosphine complex $(RuCl_2(PPh_3)_3)$ of divalent ruthenium chloride is suitable as the catalyst. When a ruthenium compound is used as a catalyst, an aluminum alkoxide is added as an activator. Furthermore, a bistriphenylphosphine complex $(FeCl_2(PPh_3)_2)$ of divalent iron, a bistriphenylphosphine complex $(NiCl_2(PPh_3)_2)$ of divalent nickel, or a bistributylphosphine complex $(NiBr_2(PBu_3)_2)$ of divalent nickel is preferred as the catalyst.

The polymerization can be performed without a solvent or in any of various solvents. Examples of the solvent include hydrocarbon solvents, such as benzene and toluene; ether solvents, such as diethyl ether and tetrahydrofuran; halogenated hydrocarbon solvents, such as methylene chloride and chloroform; ketone solvents, such as acetone, methyl ethyl ketone, and methyl isobutyl ketone; alcohol solvents, such as methanol, ethanol, propanol, isopropanol, n-butyl alcohol, and tert-butyl alcohol; nitrile solvents, such as acetonitrile, propionitrile, and benzonitrile; ester solvents, such as ethyl acetate and butyl acetate; and carbonate solvents, such as ethylene carbonate and propylene carbonate. These solvents can be used alone or as a mixture of two or more.

The polymerization can be performed in a range of 0° C. to 200° C., and preferably 50° C. to 150° C. without any purpose of restriction.

The atom transfer radical polymerization of the invention includes so called reverse atom transfer radical polymerization. The reverse atom transfer radical polymerization is a method comprising reacting an ordinary atom transfer radical polymerization catalyst in its high oxidation state resulting from radical generation, for example Cu(II') when Cu(I) is used as the catalyst, with an ordinary radical initiator, such as a peroxide, to thereby bring about an equilibrium state like in atom transfer radical polymerization (cf. Macromolecules, 1999, 32, 2872).

<Functional Groups>
Number of Crosslinkable Silyl Groups

The vinyl polymer (I) has at least one crosslinkable silyl groups. The number of crosslinkable silyl groups is, from the viewpoint of the curability of the composition and the physical properties of the cured product, preferably not smaller than 1.1 but not greater than 4.0, more preferably not smaller than 1.2 but not greater than 3.5, on average.

Positions of Crosslinkable Silyl Groups

In cases where the cured products resulting from curing of the curable composition of the present invention are especially required to have rubber-like properties, it is preferred that at least one of crosslinkable silyl groups be positioned at a terminus of the molecular chain so that the molecular weight between crosslinking sites, which has a great influence on the rubber elasticity, can be increased. More preferably, all crosslinkable functional groups are located at molecular chain termini.

Methods of producing vinyl polymers (I), in particular (meth)acrylic polymers, having at least one crosslinkable silyl group such as mentioned above at a molecular terminus thereof are disclosed in Japanese Kokoku Publication Hei-03-14068, Japanese Kokoku Publication Hei-04-55444 and Japanese Kokai Publication Hei-06-211922, among others. However, these methods are free radical polymerization methods in which the above-mentioned "chain transfer agent methods" is used and, therefore, the polymers obtained generally have problems, namely they show a molecular weight distribution represented by Mw/Mn as wide as not less than 2 as well as a high viscosity, although they have crosslinkable functional groups, in relatively high proportions, at molecular chain termini.

Therefore, for obtaining vinyl polymers showing a narrow molecular weight distribution and a low viscosity and having crosslinkable functional groups, in high proportions, at molecular chain termini, the above-described "living radical polymerization method" is preferably used.

In the following, an explanation is made of these functional groups.

Crosslinkable Silyl Groups

As the crosslinkable silyl groups of vinyl polymers (I) to be used in the practice of the present invention, there may be mentioned those groups represented by the general formula 1:

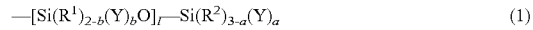

{wherein, $R^1$ and $R^2$ are the same or different and each is an alkyl group containing 1 to 20 carbon atoms, an aryl group containing 6 to 20 carbon atoms, an aralkyl group containing 7 to 20 carbon atoms or a triorganosiloxy group represented by $(R')_3SiO$— (in which R' is a univalent hydrocarbon group containing 1 to 20 carbon atoms and the three R' groups may be the same or different) and, when there are two or more $R^1$ or $R^2$ groups, they may be the same or different; Y represents a hydroxyl group or a hydrolyzable group and, when there are two or more Y groups, they may be the same or different; a represents 0, 1, 2 or 3, b represents 0, 1 or 2, and l is an integer of 0 to 19, provided that the relation a+lb≧1 should be satisfied.}

As the hydrolyzable group, there may be mentioned, among others, a hydrogen atom and those groups which are in general use, for example alkoxy, acyloxy, ketoximate, amino, amido, aminoxy, mercapto and alkenyloxy groups. Among them, alkoxy, amido and aminoxy groups are preferred. In view of mild hydrolyzability and ease of handling, alkoxy groups are particularly preferred.

One to three hydrolyzable groups and/or hydroxyl groups can be bound to each silicon atom and it is preferred that (a+Σb) be within the range of 1 to 5. When there are two or more hydrolyzable groups or hydroxyl groups in one crosslinkable silyl group, they may be the same or different. The number of silicon atoms forming the crosslinkable silyl group is not less than 1 and, in the case of silicon atoms connected by siloxane or like bonding, it is preferably not more than 20. Particularly preferred are crosslinkable silyl groups represented by the general formula 7:

(wherein $R^2$ and Y are as defined above; and a represents 1, 2 or 3) because of ready availability.

Considering the curability, the integer a is preferably 2 or more, though this is not critical. One in which a is 3 (e.g. trimethoxy functional group) is faster in curability than one in which a is 2 (e.g. dimethoxy functional group) but, as for the storage stability and/or mechanical properties (e.g. elongation), one in which a is 2 is sometimes superior. For attaining a balance between curability and physical properties, one in which a is 2 (e.g. dimethoxy functional group) and one in which a is 3 (e.g. trimethoxy functional group) may be used in combination.

<Silyl Group Introduction Method>

In the following, several methods of silyl group introduction into the vinyl polymer (I) of the present invention are described without any purpose of restriction.

As methods of synthesizing vinyl polymers (I) having at least one crosslinkable silyl group, there may be mentioned, among others, (A) the method which comprises subjecting a crosslinkable silyl group-containing hydrosilane compound to addition to a vinyl polymer having at least one alkenyl group in the presence of a hydrosilylation catalyst, (B) the method which comprises reacting a vinyl polymer having at least one hydroxyl group with a compound having, in each molecule, a crosslinkable silyl group and a group capable of reacting with the hydroxyl group, such as an isocyanato group, (C) the method which comprises subjecting a compound having, in each molecule, a polymerizable alkenyl group and a crosslinkable silyl group to reaction in synthesizing a vinyl polymer by radical polymerization, (D) the method which comprises subjecting a chain transfer agent having a crosslinkable silyl group to reaction in synthesizing a vinyl polymer by radical polymerization, and (E) the method which comprises reacting a vinyl polymer having at least one highly reactive carbon-halogen bond with a compound having, in each molecule, a crosslinkable silyl group and a stable carbanion.

The vinyl polymer having at least one alkenyl group, which is to be used in the above method (A), can be obtained by various methods. Several methods of synthesis are mentioned below, without any purpose of restriction, however.

(A-a) Method comprising subjecting to reaction a compound having, in each molecule, a polymerizable alkenyl group together with a low polymerizability alkenyl group, such as one represented by the general formula 8 shown below as a second monomer in synthesizing a vinyl polymer by radical polymerization:

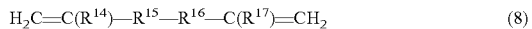

$$H_2C=C(R^{14})-R^{15}-R^{16}-C(R^{17})=CH_2 \quad (8)$$

(wherein $R^{14}$ represents a hydrogen atom or a methyl group, $R^{15}$ represents —C(O)O— or an o-, m- or p-phenylene group, $R^{16}$ represents a direct bond or a divalent organic group containing 1 to 20 carbon atoms, which may contain one or more ether bonds, and $R^{17}$ represents a hydrogen atom, an alkyl group containing 1 to 20 carbon atoms, an aryl group containing 6 to 20 carbon atoms or an aralkyl group containing 7 to 20 carbon atoms).

The time when the compound having, in each molecule, a polymerizable alkenyl group together with a low polymerizability alkenyl group is subjected to reaction is not particularly restricted but, in particular in living radical polymerization and when rubber-like properties are expected, the compound is preferably subjected to reaction as a second monomer at the final stage of the polymerization reaction or after completion of the reaction of the employed monomers.

(A-b) Method comprising subjecting to reaction a compound having at least two low polymerizability alkenyl groups, for example 1,5-hexadiene, 1,7-octadiene or 1,9-decadiene, at the final stage of the polymerization or after completion of the reaction of the monomers employed in vinyl polymer synthesis by living radical polymerization.

(A-c) Method comprising reacting a vinyl polymer having at least one highly reactive carbon-halogen bond with one of various alkenyl-containing organometallic compounds, for example an organotin such as allyltributyltin or allyltrioctyltin, for substitution of the halogen.

(A-d) Method comprising reacting a vinyl polymer having at least one highly reactive carbon-halogen bond with a stabilized, alkenyl-containing carbanion such as one represented by the general formula 9, for substitution of the halogen:

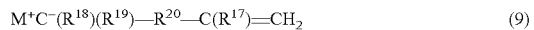

$$M^+C^-(R^{18})(R^{19})-R^{20}-C(R^{17})=CH_2 \quad (9)$$

(wherein $R^{17}$ is as defined above, $R^{18}$ and $R^{19}$ each is an electron-withdrawing group capable of stabilizing the carbanion $C^-$ or one of them is such an electron-withdrawing group and the other represents a hydrogen atom, an alkyl group containing 1 to 10 carbon atoms or a phenyl group, $R^{20}$ represents a direct bond or a divalent organic group containing 1 to 10 carbon atoms, which may contain one or more ether bonds, and $M^+$ represents an alkali metal ion or a quaternary ammonium ion).

Particularly preferred as the electron-withdrawing group $R^{18}$ and/or $R^{19}$ are those which have a structure of —CO$_2$R, —C(O)R or —CN.

(A-e) Method comprising reacting a vinyl polymer having at least one highly reactive carbon-halogen bond with a simple substance metal, such as zinc, or an organometallic compound and then reacting the thus-prepared enolate anion with an alkenyl-containing, electrophilic compound, such as an alkenyl-containing compound having a leaving group such as a halogen atom or an acetyl group, an alkenyl-containing carbonyl compound, an alkenyl-containing isocyanate compound or an alkenyl-containing acid halide.

(A-f) Method comprising reacting a vinyl polymer having at least one highly reactive carbon-halogen bond with an alkenyl-containing oxy anion or carboxylate anion such as one represented by the general formula (10) or (11), for substitution of the halogen:

$$H_2C=C(R^{17})-R^{21}-O^-M^+ \quad (10)$$

(wherein $R^{17}$ and $M^+$ are as defined above and $R^{21}$ is a divalent organic group containing 1 to 20 carbon atoms, which may contain one or more ether bonds);

$$H_2C=C(R^{17})-R^{22}-C(O)O^-M^+ \quad (11)$$

(wherein $R^{17}$ and $M^+$ are as defined above and $R^{22}$ is a direct bond or a divalent organic group containing 1 to 20 carbon atoms, which may contain one or more ether bonds).

The method of synthesizing the above-mentioned vinyl polymer having at least one highly reactive carbon-halogen bond includes, but is not limited to, atom transfer radical polymerization methods using an organic halide or the like as initiator and a transition metal complex as catalyst, as mentioned above.

It is also possible to obtain the vinyl polymer having at least one alkenyl group from a vinyl polymer having at least one hydroxyl group. As utilizable methods, there may be mentioned, for example, the following, without any purpose of restriction.

(A-g) Method comprising reacting the hydroxyl group of a vinyl polymer having at least one hydroxyl group with a base, such as sodium methoxide, followed by reaction with an alkenyl-containing halide, such as allyl chloride.

(A-h) Method comprising reacting such hydroxyl group with an alkenyl-containing isocyanate compound, such as allyl isocyanate.

(A-i) Method comprising reacting such hydroxyl group with an alkenyl-containing acid halide, such as (meth)acrylic acid chloride, in the presence of a base, such as pyridine.

(A-j) Method comprising reacting such hydroxyl group with an alkenyl-containing carboxylic acid, such as acrylic acid, in the presence of an acid catalyst.

In the practice of the present invention, when no halogen is directly involved in the alkenyl group introduction, as in the method (A-a) or (A-b), the vinyl polymer is preferably synthesized by living radical polymerization. From the viewpoint of ready controllability, the method (A-b) is more preferred.

In cases where alkenyl group introduction is effected by conversion of the halogen atom of a vinyl polymer having at least one highly reactive carbon-halogen atom, use is preferably made of a vinyl polymer having at least one terminal carbon-halogen bond, which is highly reactive, as obtained by subjecting a vinyl monomer to radical polymerization (atom transfer radical polymerization) using, as an initiator, an organic halide or halogenated sulfonyl compound having at least one highly reactive carbon-halogen bond and, as a catalyst, a transition metal complex. In view of easier controllability, the method (A-f) is more preferred.

The crosslinkable silyl group-containing hydrosilane compound is not particularly restricted but includes, as typical examples, compounds represented by the general formula 12.

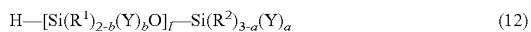
$$H-[Si(R^1)_{2-b}(Y)_bO]_l-Si(R^2)_{3-a}(Y)_a \quad (12)$$

{wherein $R^1$ and $R^2$ are the same or different and each represents an alkyl group containing 1 to 20 carbon atoms, an aryl group containing 6 to 20 carbon atoms, an aralkyl group containing 7 to 20 carbon atoms or a triorganosiloxy group represented by $(R')_3SiO—$ (in which R' is a univalent hydrocarbon group containing 1 to 20 carbon atoms and the three R' groups may be the same or different) and, when there are two or more $R^1$ or $R^2$ groups, they may be the same or different; Y represents a hydroxyl group or a hydrolyzable group and, when there are two or more Y groups, they may be the same or different; a represents 0, 1, 2 or 3, b represents 0, 1 or 2 and l is an integer of 0 to 19, provided that the relation a+lb≧1 should be satisfied}.

Particularly preferred among those hydrosilane compounds in view of ready availability are crosslinkable group-containing compounds represented by the general formula 13:

$$H—Si(R^2)_{3-a}(Y)_a \quad (13)$$

(wherein $R^2$ and Y are as defined above; and a represents 1, 2 or 3).

In subjecting the above crosslinkable silyl-containing hydrosilane compound to addition to the alkenyl group, a transition metal catalyst is generally used. The transition metal catalyst includes, among others, simple substance platinum; solid platinum dispersed on a support such as alumina, silica or carbon black; chloroplatinic acid; chloroplatinic acid complexes with alcohols, aldehydes, ketones or the like; platinum-olefin complexes; and platinum(0)-divinyltetramethyldisiloxane complex. As other catalysts than platinum compounds, there may be mentioned $RhCl(PPh_3)_3$, $RhCl_3$, $RuCl_3$, $IrCl_3$, $FeCl_3$, $AlCl_3$, $PdCl_2 \cdot H_2O$, $NiCl_2$ and $TiCl_4$, for instance.

The method of producing the vinyl polymer having at least one hydroxyl group, which polymer is to be used in the methods (B) and (A-g) to (A-j), includes, but is not limited to, the following, among others.

(B-a) Method comprising subjecting to reaction, as a second monomer, a compound having both a polymerizable alkenyl group and a hydroxyl group in each molecule, for example one represented by the general formula 14 given below, in synthesizing the vinyl polymer by radical polymerization:

$$H_2C=C(R^{14})—R^{15}—R^{16}—OH \quad (14)$$

(wherein $R^{14}$, $R^{15}$ and $R^{16}$ are as defined above).

The time for subjecting to reaction the compound having both a polymerizable alkenyl group and a hydroxyl group in each molecule is not critical but, in particular in living radical polymerization, when rubber-like properties are demanded, the compound is preferably subjected to reaction as a second monomer at the final stage of the polymerization reaction or after completion of the reaction of the employed monomer.

(B-b) Method comprising subjecting an alkenyl alcohol, such as 10-undecenol, 5-hexenol or allyl alcohol, to reaction at the final stage of polymerization reaction or after completion of the reaction of the employed monomer in synthesizing the vinyl polymer by living radical polymerization.

(B-c) Method comprising radical-polymerizing a vinyl monomer using a hydroxyl-containing chain transfer agent, such as a hydroxyl-containing polysulfide, in large amounts, as described in Japanese Kokai Publication Hei-05-262808, for instance.

(B-d) Method comprising subjecting a vinyl monomer to radical polymerization using hydrogen peroxide or a hydroxyl-containing initiator, as described in Japanese Kokai Publication Hei-06-239912 and Japanese Kokai Publication Hei-08-283310, for instance.

(B-e) Method comprising subjecting a vinyl monomer to radical polymerization using an alcohol in excess, as described in Japanese Kokai Publication Hei-06-116312, for instance.

(B-f) Method comprising introducing a terminal hydroxyl group by hydrolyzing the halogen atom of a vinyl polymer having at least one highly reactive carbon-halogen bond or reacting such halogen atom with a hydroxyl-containing compound, according to the method described in Japanese Kokai Publication Hei-04-132706, for instance.

(B-g) Method comprising reacting a vinyl polymer having at least one highly reactive carbon-halogen bond with a hydroxyl-containing stabilized carbanion, such as one represented by the general formula 15 for substitution of the halogen atom:

$$M^+C^-(R^{18})(R^{19})—R^{20}—OH \quad (15)$$

(wherein $R^{18}$, $R^{19}$ and $R^{20}$ are as defined above).

Particularly preferred as the electron-withdrawing groups $R^{18}$ and $R^{19}$ are those having a structure of $—CO_2R$, $—C(O)R$ or $—CN$.

(B-h) Method comprising reacting a vinyl polymer having at least one highly reactive carbon-halogen bond with a simple substance metal, such as zinc, or an organometallic compound and then reacting the thus-prepared enolate anion with an aldehyde or ketone.

(B-i) Method comprising reacting a vinyl polymer having at least one highly reactive carbon-halogen bond with a hydroxyl-containing oxy anion or carboxylate anion, such as one represented by the general formula 16 or 17 given below, for substitution of the halogen atom:

$$HO—R^{21}—O^-M^+ \quad (16)$$

(wherein $R^{21}$ and $M^+$ are as defined above);

$$HO—R^{22}—C(O)O^-M^+ \quad (17)$$

(wherein $R^{22}$ and $M^+$ are as defined above).

(B-j) Method comprising subjecting, as a second monomer, a compound having a low polymerizable alkenyl group and a hydroxyl group in each molecule to reaction at the final stage of the polymerization reaction or after completion of the reaction of the employed monomer in synthesizing the vinyl polymer by living radical polymerization.

Such compound is not particularly restricted but may be a compound represented by the general formula 18, for instance:

$$H_2C=C(R^{14})—(R^{21})—OH \quad (18)$$

(wherein $R^{14}$ and $R^{21}$ are as defined above).

The compound represented by the above general formula 18 is not particularly restricted but, in view of ready availability, alkenyl alcohols such as 10-undecenol, 5-hexenol and allyl alcohol are preferred.

In the practice of the present invention, when no halogen is directly involved in hydroxyl group introduction, as in the methods (B-a) to (B-e) and (B-j), the vinyl polymer is preferably synthesized by living radical polymerization. The method (B-b) is more preferred from the viewpoint of ease of control.

In cases where hydroxyl group introduction is effected by conversion of the halogen atom of a vinyl polymer having at least one highly reactive carbon-halogen atom, use is preferably made of a vinyl polymer having at least one terminal carbon-halogen bond, which is highly reactive, as obtained by subjecting a vinyl monomer to radical polymerization (atom transfer radical polymerization) using an organic halide or halogenated sulfonyl compound as an initiator and, as a catalyst, a transition metal complex. From the viewpoint of ease of control, the method (B-i) is more preferred.

As the compound having a crosslinkable silyl group and a group capable of reacting with a hydroxyl group, such as an isocyanato group, in each molecule, there may be mentioned, for example, γ-isocyanatopropyltrimethoxysilane, γ-isocyanatopropylmethyldimethoxysialne, γ-isocyanatopropyltriethoxysilane and the like. If necessary, any of urethane formation reaction catalysts generally known in the art can be used.

The compound having both a polymerizable alkenyl group and a crosslinkable silyl group in each molecule, which is to be used in the method (C), includes, among others, γ-trimethoxysilylpropyl(meth)acrylate, γ-methyldimethoxysilylpropyl(meth)acrylate and like compounds represented by the general formula 19 given below:

$$H_2C=C(R^{14})—R^{15}—R^{23}—[Si(R^1)_{2-b}(Y)_bO]_l—Si(R^2)_{3-a}(Y)_a \quad (19)$$

(wherein $R^1$, $R^2$, $R^{14}$, $R^{15}$, Y, a, b and l are as defined above and $R^{23}$ is a direct bond or a divalent organic group containing 1 to 20 carbon atoms, which may contain one or more ether bonds, provided that the relation a+lb≧1 should be satisfied).

The time for subjecting the compound having both a polymerizable alkenyl group and a crosslinkable silyl group in each molecule is not critical but, in particular in living radical polymerization and when rubber-like properties are demanded, the compound is preferably subjected to reaction as a second monomer at the final stage of the polymerization reaction or after completion of the reaction of the employed monomer.

The chain transfer agent having a crosslinkable silyl group, which is to be used in the chain transfer agent method (D), includes mercaptan having a crosslinkable silyl group, hydrosilane having a crosslinkable silyl group, and the like, described in Japanese Kokoku Publication Hei-03-14068, Japanese Kokoku Publication Hei-04-55444, for instance.

The method of synthesizing the vinyl polymer having at least one highly reactive carbon-halogen bond, which is to be used in the method (E), includes, but is not limited to, the atom transfer radical polymerization method which uses an organic halide or the like as an initiator and a transition metal complex as a catalyst.

As the compound having both a crosslinkable silyl group and a stabilized carbanion in each molecule, there may be mentioned compounds represented by the general formula 2:

$$M^+C^-(R^{18})(R^{19})—R^{24}—C(H)(R^{25})—CH_2—[Si(R^1)_{2-b}(Y)_bO]_l—Si(R^2)_{3-a}(Y)_a \quad (20)$$

(wherein $R^1$, $R^2$, $R^{18}$, $R^{19}$, Y, a, b, l and $M^+$ are as defined above, $R^{24}$ is a direct bond or a divalent organic group containing 1 to 10 carbon atoms, which may contain one or more ether bonds, and $R^{25}$ represents a hydrogen atom, an alkyl group containing 1 to 10 carbon atoms, an aryl group containing 6 to 10 carbon atoms or an aralkyl group containing 7 to 10 carbon atoms, provided that the relation a+lb≧1 should be satisfied).

Particularly preferred as the electron-withdrawing groups $R^{18}$ and $R^{19}$ are those having a structure of —$CO_2R$, —C(O) or —CN.

<<Micronized Hydrophobic Silica (II)>>

The micronized hydrophobic silica (II) of the invention may be micronized silica such as fumed silica (fume-like silica).

The micronized silica is a highly dispersible white silicon dioxide consisting of spherical primary particles produced from a volatile silane compound using high temperature flame hydrolysis method. The primary particles do not exist separately but form agglomerates or bulk particles. These particles have siloxane or silanol groups on the surface.

The micronized hydrophobic silica (II) of the invention is the one chemically surface-treated by reaction of the silanol groups with silanes, silazanes and the like. Preferable examples are those which are treated with organosilicon compound such as dimethyldichlorosilane, hexamethyldisilazane, dimethylsiloxane, trimethoxyoctylsilane, and dimethylsilicone to exhibit hydrophobicity. The treatment for making the surface hydrophobic causes an effect to suppress water absorption and make the micronized silica easy to be dispersed in the vinyl polymer (I) produced by the living radical polymerization.

Examples of available commercial products of the micronized hydrophobic silica (II) are Aerosil manufactured by Nippon Aerosil Co., Ltd., Sylophobic manufactured by FUJI SILYSIA CHEMICAL LTD., and the like.

The particle diameter of the micronized hydrophobic silica (II) is not particularly limited and smaller diameter is preferable, however. It is because if the particle diameter of the micronized hydrophobic silica (II) is smaller than the wavelength of visible light rays, transparency seems to be obtained when the micronized hydrophobic silica (II) is dispersed in the curable composition of the invention.

Practically, the preferred micronized silica is an ultrafine-micronized silica which has a specific surface area (measured by BET adsorption method) of preferably 50 m²/g or higher, more preferably about 50 to 400 m²/g, and further preferably about 100 to 300 m²/g. The BET adsorption method is a method which makes an inert gas molecule, having known adsorption occupying surface area, to be physically adsorbed onto the powder particle surface at a liquefied nitrogen temperature in order to determine the specific surface area of the specimen from the amount of adsorption.

In conversion of the specific surface area into the particle diameter, about 50 m²/g specific surface area is equivalent to 20 nm=0.02 μm. Accordingly the particle diameter of the micronized hydrophobic silica (II) is preferably 0.02 μm or smaller.

The addition amount of the micronized hydrophobic silica (II) is preferably 1 to 200 parts by weight, and particularly preferably 3 to 100 parts by weight, per 100 parts by weight of the vinyl polymer (I) containing a crosslinkable silyl group. If the addition amount of the micronized hydrophobic silica (II) is small and lower than 1 part by weight, the reinforcing effect and thixotropy providing effect onto the cured product tend to be difficult to be exhibited. On the other hand, if the addition amount exceeds 200 parts by weight, the viscosity of the curable composition tends to be high before curing and therefore high power is required on extruding the curable composition out of a cartridge, which tends to result in decrease of the workability.

<<Graft Copolymer (III) Obtained by Graft Polymerization of a Crosslinkable Rubber-Like Acrylic Ester Polymer and a Vinyl Monomer>>

The graft copolymer, which is the component (III) of the invention and obtained by graft polymerization of a crosslinkable rubber-like acrylic ester polymer and a vinyl monomer, is a core-shell type graft copolymer containing a rubber-like polymer [A] with a glass transition temperature of 0° C. or lower as a core layer and a polymer [B] as a shell layer (hereinafter, referred to as graft copolymer (III) for short).

The rubber-like polymer [A] constituting the core layer of the graft copolymer (III) described above may have a single layer structure or a multilayer structure comprising two or more layers. Similarly, the polymer [B] constituting the shell layer may have a single layer structure or a multilayer structure comprising two or more layers.

Generally, graft copolymers (III) are obtained by graft copolymerization of the rubber-like polymer [A] and a monomer mixture (b) and, in most cases, they are obtained by graft polymerization of a monomer mixture (b) in the presence of a rubber latex [A'] containing the rubber-like polymer [A] as a solid matter.

The monomer mixture (b) consequently gives the polymer [B] by graft polymerization.

The rubber-like polymer [A] is a polymer obtained by polymerization of a monomer mixture (a) containing a monomer (a-1) (butadiene and/or an acrylic alkyl ester); an aromatic vinyl monomer (a-2); a vinyl monomer (a-3) copolymerizable with the monomer (a-1) (butadiene and/or an acrylic alkyl ester) and the aromatic vinyl monomer (a-2) [hereinafter, the vinyl monomer (a-3) being referred to as a copolymerizable vinyl monomer (a-3)]; and a polyfunctional monomer (a-4).

By polymerizing the above-mentioned monomer mixture (a), using emulsion polymerization for example, a rubber latex [A'] containing rubber-like polymer [A] can be obtained. In the case where the rubber-like polymer [A] is obtained by emulsion polymerization, the rubber-like polymer [A'] can be used as such, in the form of the rubber latex [A'] dispersed in an aqueous medium, for the graft copolymerization with the monomer mixture (b). The monomer (a-1) (butadiene and/or an acrylic alkyl ester) is a component for improving the weather resistance.

Butadiene to be used for the monomer (a-1) (butadiene and/or an acrylic alkyl ester) is usually 1,3-butadiene. As typical examples of the acrylic alkyl ester, there may be mentioned, for example, acrylic alkyl esters having an alkyl group of 1 to 8 carbon atoms, that is, methyl acrylate, ethyl acrylate, butyl acrylate, 2-ethylhexyl acrylate and the like, without any purpose of restriction. The butadiene and/or acrylic alkyl ester may be used respectively alone or as a mixture of two or more of them.

To sufficiently improve the impact resistance of the molded article to be finally obtained, the use amount of the monomer (a-1) (butadiene and/or an acrylic alkyl ester) is 50 to 100% by weight per the total amount of the polymer components for obtaining the rubber-like polymer [A].

The ratio of butadiene and acrylic alkyl ester contained in the monomer (a-1) (butadiene and/or an acrylic alkyl ester) is not particularly limited and, to give high weather resistance to the curable composition to be finally obtained, the ratio is preferably 0 to 25% by weight of butadiene and 75 to 100% by weight of acrylic alkyl ester, more preferably 0 to 12% by weight of butadiene and 88 to 100% by weight of acrylic alkyl ester, and most preferably 0% by weight of butadiene and 100% by weight of acrylic alkyl ester, per 100% by weight of the total of butadiene and acrylic alkyl ester.

The above-mentioned aromatic vinyl monomer (a-2) is a component having a function of improving the transparency of the cured product to be finally obtained from the vinyl polymer (I) of the invention and thus is used for adjusting the difference between the refractive index of the graft copolymer (III) and the one of the vinyl polymer (I) as narrow as possible.

As typical examples of the aromatic vinyl monomer (a-2), there may be mentioned, for example, styrene, α-methylstyrene, 1-vinylnaphthalene, 2-vinylnaphthalene, without any purpose of restriction. These aromatic vinyl monomers may be used alone or two or more of them may be used as a mixture.

The use amount of the aromatic vinyl monomer (a-2) is most preferably 0 to 50% by weight per the total amount of the polymerization components in the case of obtaining the rubber-like polymer [A] in order to avoid the situation where the desired rubber-like polymer [A] is difficult to be obtained due to the relatively decreased use amount of the monomer (a-1) (butadiene and/or an acrylic alkyl ester).

The copolymerizable vinyl monomer (a-3) is a component to be used for fine adjustment of the compatibility of the graft copolymer (III) and the vinyl polymer (I).

As typical examples of the copolymerizable vinyl monomer (a-3), there may be mentioned, for example, cyano vinyl monomers such as acrylonitrile and methacrylonitrile, 4-hydroxybutyl acrylate, without any purpose of restriction. These vinyl monomers may be used alone or two or more of them are used as a mixture.

The use amount of the copolymerizable vinyl monomer (a-3) is 0 to 20% by weight, preferably 0 to 10% by weight, and more preferably 0% by weight per the total amount of the polymerization components in the case of obtaining the rubber-like polymer [A] in order to avoid the situation where the desired rubber-like polymer [A] is difficult to be obtained due to the relatively decreased use amount of the monomer (a-1) (butadiene and/or an acrylic alkyl ester).

The polyfunctional monomer (a-4) is a component for forming a crosslinked structure in the rubber-like polymer [A] to be obtained.

As typical examples of the polyfunctional monomer (a-4), there may be mentioned, for example, divinylbenzene, allyl acrylate, allyl methacrylate, without any purpose of restriction. Further, so-called macromer, which is a molecule having radical polymerizable functional groups at both termini, e.g. α,ω-dimethacryloxypolyoxyethylene, is also usable for the polyfunctional monomer (a-4). These polyfunctional monomers may be used alone or two or more of them may be used as a mixture.

The use amount of the polyfunctional monomer (a-4) is 0 to 5% by weight and preferably 0.1 to 3% by weight per the total amount of the polymerization components in the case of obtaining the rubber-like polymer [A] in order to avoid the situation where the desired rubber-like polymer [A] is difficult to be obtained due to the relatively decreased use amount of the monomer (a-1) (butadiene and/or an acrylic alkyl ester).

A method of obtaining the rubber-like polymer [A] is not particularly limited and, for example, a method involving adding an aqueous medium, a polymerization initiator, an emulsifier and the like to the monomer mixture (a) containing respectively desired amounts of the monomer (a-1) (butadiene and/or an acrylic alkyl ester), the aromatic vinyl monomer (a-2), the copolymerizable vinyl monomer (a-3), and the polyfunctional monomer (a-4), and then polymerizing the resulting mixture by a normal emulsion polymerization method etc. in order to obtain the polymer [A] contained in the rubber latex [A'].

The aqueous medium is a liquid which contains not less than 90% by weight of water and the composition of which makes the emulsion polymerization practically possible therein. The aqueous medium may contain 10% by weight or less of a liquid other than water and mixable with water as long as emulsification polymerization in the aqueous medium is possible. As examples of the liquid other than water and mixable with water, there may be mentioned acetone, methyl alcohol, ethyl alcohol, propyl alcohol, butyl alcohol, tetrahydrofuran, dimethylformaldehyde and the like, without any purpose of restriction.

As examples of the polymerization initiator, there may be mentioned organic peroxides, e.g. peroxides of ketones or aldehydes such as cyclohexanone peroxide; diacyl peroxide such as acetyl peroxide; hydroperoxides such as tert-butyl hydroperoxide and cumene hydroperoxide; dialkyl peroxides such as di-tert-butyl peroxide; alkyl esters such as tert-butyl perisobutylate; and percarbonates such as tert-butyl peroxyisopropyl carbonate; inorganic peroxides such as hydrogen peroxide and potassium persulfate; and azo compounds such as 2,2'-azobisisobutyronitrile; and the like, without any purpose of restriction. In the case where the organic peroxides and/or inorganic peroxides are used among them, they may be used as a thermal decomposition type polymerization initiator or as a redox type polymerization initiator by combinedly using a reducing agent such as sodium ascorbate and sodium formaldehydesulfoxylate and, if necessary, a promoter such as ferrous sulfate and a chelating agent such as ethylenediamine tetraacetate.

Examples of the emulsifier are surfactants and the like. The types of the surfactants are not particularly limited and may include anionic surfactants, nonionic surfactants, cationic surfactants, combinations of an anionic surfactant and a nonionic surfactant, and combinations of a cationic surfactant and a nonionic surfactant. Examples of the anionic surfactants are not particularly limited and may include alkali metal salts of a fatty acid, such as potassium palmitate, sodium oleate, and sodium stearate; alkali metal salts or amine or ammonium salts of a higher alcohol sulfuric acid ester, such as sodium dodecyl sulfate, triethanol amine dodecyl sulfate, and ammonium dodecyl sulfate; alkali metal salts of an alkylbenzenesulfonic acid or alkylnaphthalenesulfonic acid, such as sodium dodecylbenzenesulfonate, and sodium dodecylnaphthalenesulfonate; alkali metal salts, such as a sodium salt, of a naphthalenesulfonic acid formalin condensate; alkali metal salts, such as a sodium salt, of a dialkylsulfosuccinic acid; alkylphosphate salts such as alkyl phosphoric acid salts; and polyoxyethylene sulfates such as sodium polyoxyethylene alkyl ether sulfate, and sodium polyoxyethylene alkylphenyl ether sulfate. Examples of the nonionic surfactants are not particularly limited and may include polyoxyethylene alkyl ethers such as polyoxyethylene dodecyl ether and polyoxyethylene stearyl ether; polyoxyethylene alkylphenol ethers such as polyoxyethylene nonylphenol ether; sorbitan fatty acid esters such as sorbitan monostearate, sorbitan distearate, and sorbitan sesquioleate; polyoxyethylene sorbitan fatty acid esters such as polyoxyethylene sorbitan monostearate; polyoxyethylene acyl esters such as polyethylene glycol monostearate and polyethylene glycol distearate; oxyethylene-oxypropylene block polymer (molecular weight of about 2,000 to about 10,000); and fatty acid monoglycerides such as glyceryl monooleate. Further, the cationic surfactants are not particularly limited and may include alkylamines such as dodecylamine acetate; quaternary ammonium salts such as dodecyltrimethylammonium chloride; and polyoxyethylene alkylamines. In addition to them, polymer surfactants may be used.

The addition and polymerization of the monomer mixture (a) at the time of obtaining the rubber-like polymer [A] may be carried out in one stage or in multi-stages, without any purpose of particular restriction. The addition of the monomer mixture (a) may be batch-wise or continuous, or in two- or more-steps each of these steps being carried out in a combination of the above-mentioned two methods, without any purpose of particular restriction.

The reaction temperature is preferably 20 to 90° C., more preferably 30 to 70° C., and further preferably 40 to 60° C.

The monomer mixture (a) may be obtained by the above-mentioned method of previously mixing the respectively desired amounts of the monomer (a-1) (butadiene and/or an acrylic alkyl ester), the aromatic vinyl monomer (a-2), the copolymerizable vinyl monomer (a-3), and the polyfunctional monomer (a-4), and also by a method of separately adding the respectively desired amounts of the monomer (a-1) (butadiene and/or an acrylic alkylester), the aromatic vinyl monomer (a-2), the copolymerizable vinyl monomer (a-3), and the polyfunctional monomer (a-4) to a reactor previously fed with the aqueous medium, the initiator, the emulsifier and the like, or adding a combination of some of them, and stirring and blending the mixture in the reactor in order to obtain the final product as a micelle. In this case, by shifting the content of the reactor to the condition where polymerization can be started, polymerization of the monomer mixture (a) may be carried out by a normal emulsion polymerization method etc. in order to obtain the rubber-like polymer [A] contained in the rubber latex [A'].

The glass transition temperature of the rubber-like polymer [A] obtained in the above manner is controlled to be 0° C. or lower to make the molded article to be finally obtained sufficiently deformable even in the case where high deformation rate is applied thereto.

The monomer mixture (b) contains a methacrylic alkyl ester monomer (b-1); an acrylic alkyl ester monomer (b-2); an aromatic vinyl monomer (b-3); a cyano vinyl monomer (b-4); and a vinyl monomer (b-5) copolymerizable with the methacrylic alkyl ester monomer (b-1), the acrylic alkyl ester monomer (b-2), the aromatic vinyl monomer (b-3), and the cyano vinyl monomer (b-4) [hereinafter, the vinyl monomer (b-5) being referred to as a copolymerizable vinyl monomer (b-5)].

The methacrylic alkyl ester monomer (b-1) is a component to be used for improving the adhesiveness of the graft copolymer (III) and the vinyl polymer (I) and thereby improving the strength of the cured product to be finally obtained from the curable composition of the invention.

As typical examples of the methacrylic alkyl ester monomer (b-1), there may be mentioned, for example, methacrylic alkyl esters having an alkyl group of 1 to 5 carbon atoms, that is, methyl methacrylate, ethyl methacrylate, butyl methacrylate and the like, without any purpose of restriction. These methacrylic alkyl esters may be used alone or as a mixture of two or more of them.

The use amount of the methacrylic alkyl ester monomer (b-1) is 10 to 100% by weight per the total amount of the monomer mixture (b).

Use of methyl methacrylate for the methacrylic alkyl ester monomer (b-1) in an amount of preferably 60 to 100% by weight and more preferably 80 to 100% by weight provides the curable composition to be finally obtained with particularly desirable strength.

The acrylic alkyl ester monomer (b-2) is a component which adjusts the softening temperature of the shell layer of the graft copolymer (III) in order to promote dispersion of the graft copolymer in the vinyl polymer (I) in the finally obtained curable composition, and thereby provides the cured product to be finally obtained with desirable strength.

As typical examples of the acrylic alkyl ester monomer (b-2), there may be mentioned, for example, acrylic alkyl esters having an alkyl group of 2 to 12 carbon atoms, that is, ethyl acrylate, butyl acrylate, 2-ethylhexyl acrylate, and the like, without any purpose of restriction. These acrylic alkyl esters may be used alone or as a mixture of two or more of them.

The use amount of the acrylic alkyl ester monomer (b-2) is 0 to 60% by weight per the total amount of the monomer mixture (b).

In order to sufficiently keep the adhesiveness between the graft copolymer (III) and the vinyl polymer (I), and simultaneously in a good balance, to give good dispersion of the graft copolymer in the vinyl polymer (I) in the cured product to be finally obtained, the ratios of the methacrylic alkyl ester monomer (b-1) and the acrylic alkyl ester monomer (b-2) are preferably 60 to 100% by weight of the methacrylic alkyl ester monomer (b-1) and 0 to 40% by weight of the acrylic alkyl ester monomer (b-2) per 100% by weight of the total of the methacrylic alkyl ester monomer (b-1) and acrylic alkyl ester monomer (b-2) contained in the monomer mixture (b).

The aromatic vinyl monomer (b-3) is a component to be used for improving the transparency of the cured product to be finally obtained and adjusting the difference between the refractive index of the graft copolymer (III) and the one of the vinyl polymer (I) to be used as narrow as possible.

As typical examples of the aromatic vinyl monomer (b-3), there may be mentioned, for example, monomers exemplified as the typical examples of the aromatic vinyl monomer (a-2), without any purpose of restriction. The aromatic vinyl monomers may be used alone or two or more of them may be used as a mixture.

The use amount of the aromatic vinyl monomer (b-3) is 0 to 90% by weight, preferably 0 to 10% by weight, and more preferably 0% by weight per the total amount of the monomer mixture (b) in order to avoid the situation where the strength of the curable composition to be finally obtained is difficult to be sufficiently improved due to the relatively decreased use amount of the methacrylic alkyl ester monomer (b-1).

The cyano vinyl monomer (b-4) is a component to be used for finely adjusting the compatibility between the graft copolymer (III) and the vinyl polymer (I).

As typical examples of the cyano vinyl monomer (b-4), there may be mentioned, for example, acrylonitrile and methacrylonitrile, without any purpose of restriction. These cyano vinyl monomers may be used alone or two or more of them are used as a mixture.

The use amount of the cyano vinyl monomer (b-4) is 0 to 25% by weight and preferably 0% by weight per the total amount of the monomer mixture (b) in order to avoid the situation where the strength of the curable composition to be finally obtained is difficult to be sufficiently improved due to the relatively decreased use amount of the methacrylic alkyl ester monomer (b-1).

As typical examples of the copolymerizable vinyl monomer (b-5), there may be mentioned, for example, methyl acrylate, 4-hydroxybutyl acrylate, and glycidyl methacrylate, without any purpose of restriction. These vinyl monomers may be used alone or two or more of them are used as a mixture.

The use amount of the copolymerizable vinyl monomer (b-5) is 0 to 25% by weight, preferably 0 to 10% by weight, and more preferably 0% by weight per the total amount of the monomer mixture (b) in order to avoid the situation where the strength of the curable composition to be finally obtained is difficult to be sufficiently improved due to the relatively decreased use amount of the methacrylic alkyl ester.

As described, the graft copolymer (III) is obtained by graft copolymerization of the rubber-like polymer [A] and the monomer mixture (b). The monomer mixture (b) gives the polymer [B] as a result of the graft polymerization.

The use amounts of the rubber-like polymer [A] and the monomer mixture (b) are 50% by weight or more, preferably 60% by weight or more of the rubber-like polymer [A] and, at the same time, 50% by weight or less, preferably 40% by weight or less of the monomer mixture (b), respectively, in order to sufficiently improve the strength of the cured product to be finally obtained from the vinyl polymer (I) of the invention.

A method of obtaining the graft copolymer (III) is not particularly limited and there may be mentioned, for example, a method involving adding the monomer mixture (b) containing respectively desired amounts of the methacrylic alkyl ester monomer (b-1), the acrylic alkyl ester monomer (b-2), the aromatic vinyl monomer (b-3), the cyano vinyl monomer (b-4), and the copolymerizable vinyl monomer (b-5) to the above-produced rubber latex [A'] containing the rubber-like polymer [A] having a glass transition temperature of 0° C. or lower, and then adding the same polymerization initiator as above-mentioned one, or the like for carrying out polymerization in a normal manner in order to obtain a graft copolymer in a powder form from the graft copolymer latex, and the like methods.

The addition and polymerization of the monomer mixture (b) may be carried out in one stage or in multi-stages, without any purpose of particular restriction. The addition of the monomer mixture (b) may be batch-wise or continuous, or in two- or more-steps each of these steps being carried out in a combination of the above-mentioned two methods, without any purpose of particular restriction.

The reaction temperature is preferably 20 to 90° C., more preferably 30 to 70° C., and further preferably 40 to 60° C.

The average particle diameter of the graft copolymer (III) obtained in such a manner is preferable in a range from 0.03 to 0.28 µm.

A method for obtaining the graft copolymer (III) of the invention in a powder form is not particularly limited and the graft copolymer (III) in a powder form can be obtained, for example, by coagulation with an acid or a salt followed by a heat treatment, a dehydration treatment and/or a drying treatment etc., or a spray drying treatment; by coagulation followed by a dehydration treatment, and then followed by a melting; or by the like method.

The use amount of the graft copolymer (III) is in a range of preferably 1 to 200 parts by weight, and more preferably 1 to 50 parts by weight, per 100 parts by weight of the vinyl polymer (I). If the use amount of the graft copolymer (III) exceeds 200 parts by weight, the viscosity of the curable composition becomes high and the workability tends to be lowered.

<<Polyoxyalkylene Polymer (IV) Containing at Least One Crosslinkable Silyl Group>>

The polyoxyalkylene polymer (IV) containing a crosslinkable silyl group(s) (also referred to as a polyoxyalkylene polymer (IV)), which is used in the present invention, is described in such patent documents as Japanese Kokoku Publication Sho-45-36319, Japanese Kokoku Publication Sho-46-12154, Japanese Kokoku Publication Sho-49-32673, Japanese Kokai Publication Sho-50-156599, Japanese Kokai Publication Sho-51-73561, Japanese Kokai Publication Sho-54-6096, Japanese Kokai Publication Sho-55-82123, Japanese Kokai Publication Sho-55-123620, Japanese Kokai Publication Sho-55-125121, Japanese Kokai Publication Sho-55-131022, Japanese Kokai Publication Sho-55-135135 and Japanese Kokai Publication Sho-55-137129.

Preferably, the molecular chain of the polyoxyalkylene polymer (IV) is essentially constituted of a repeating unit represented by the general formula:

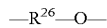

$$—R^{26}—O—$$

(wherein $R^{26}$ is a bivalent organic group). $R^{26}$ is preferably a bivalent hydrocarbon group containing 3 to 6 carbon atoms, more preferably mostly a hydrocarbon group containing 3 or 4 carbon atoms. Specific examples of $R^{26}$ are —CH(CH$_3$)—CH$_2$—, —CH(C$_2$H$_5$)—CH$_2$—, —C(CH$_3$)$_2$—CH$_2$— and —CH$_2$—CH$_2$—CH$_2$—CH$_2$—. The molecular chain of the polyoxyalkylene polymer (IV) may be constituted of one single repeating unit species or two or more repeating unit species. The group —CH(CH$_3$)—CH$_2$— is preferred as $R^{26}$ particularly because the polymer viscosity can be adequately reduced and the cured product can be provided with an appropriate level of flexibility by using that group.

The polyoxyalkylene polymer (IV) may be straight or branched or of a straight/branched mixed type. Some other monomer unit(s), for instance, may be contained therein. For attaining good workability and/or rendering the cured product flexible, however, the content of the repeating unit represented by —CH(CH$_3$)—CH$_2$—O— in the polymer is preferably not lower than 50% by weight, more preferably not lower than 80% weight.

The crosslinkable silyl group occurring in the polyoxyalkylene polymer (IV) and capable of being crosslinked under formation of a siloxane bond may be the same as the crosslinkable silyl group in the vinyl polymer (I). Thus, mention may be made of a group represented by the general formula 1:

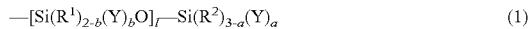

$$—[Si(R^1)_{2-b}(Y)_bO]_l—Si(R^2)_{3-a}(Y)_a \qquad (1)$$

(wherein $R^1$ and $R^2$ are the same or different and each represents an alkyl group containing 1 to 20 carbon atoms, an aryl group containing 6 to 20 carbon atoms, an aralkyl group containing 7 to 20 carbon atoms or a triorganosiloxy group represented by (R')$_3$SiO— (in which R' is a hydrocarbon group containing 1 to 20 carbon atoms and the three R' groups may be the same or different) and when there are two or more $R^1$ or $R^2$ groups, they may be the same or different; Y represents a hydroxyl group or a hydrolyzable group and when there are two or more Y groups, they may be the same or different; a represents 0, 1, 2 or 3, represents 0, 1 or 2; l is an integer of 0 to 19; provided that the relation a+lb≧1 should be satisfied).

The hydrolyzable group includes, among others, a hydrogen atom and groups in conventional use, such as alkoxy, acyloxy, ketoximate, amino, amide, aminoxy, mercapto and alkenyloxy groups. Among these, alkoxy, amide and aminoxy groups are preferred, and alkoxy groups are particularly preferred in view of their mild hydrolyzability and easy handleability.

One to three of such hydrolyzable groups and hydroxyl groups can be bound to each silicon atom, and the sum (a+Σb) is preferably within the range of 1 to 5. In cases where there are two or more hydrolyzable/hydroxyl groups bound in the crosslinkable silyl group, they may be the same or different. The number of crosslinkable silyl group-constituting silicon atoms is at least 1 and, when a plurality of silicon atoms are linked together by siloxane bonding or the like, the number of silicon atoms is preferably not greater than 20. In particular, crosslinkable silyl groups represented by the general formula 7:

$$—Si(R^2)_{3-a}(Y)_a \qquad (7)$$

(wherein $R^2$ and Y are as defined above; and a represents 1, 2 or 3): are preferred because of their ready availability.

Considering the curability, the integer a is preferably 2 or more, although this is not critical. One in which a is 3 (e.g. trimethoxy functional group) is faster in curability than one in which a is 2 (e.g. dimethoxy functional group) but, as for the storage stability and/or mechanical properties (e.g. elongation), one in which a is 2 is sometimes superior. For attaining a balance between curability and physical properties, one in which a is 2 (e.g. dimethoxy functional group) and one in which a is 3 (e.g. trimethoxy functional group) may be used in combination.

The average number of the crosslinkable silyl groups occurring in the polyoxyalkylene polymer (IV) is preferably at least one, more preferably within the range of 1.1 to 5, per molecule of that polymer. When the number of the crosslinkable silyl groups contained in the polyoxyalkylene polymer (IV) is smaller than 1, the curability becomes insufficient and the desired good rubber elasticity behavior can hardly be displayed. On the other hand, when it is larger than 5, the cured product becomes hard and the applicability to joints unfavorably decreases.

The crosslinkable silyl groups may occur terminally or internally in the molecular chain of the polyoxyalkylene polymer (IV). When the crosslinkable silyl groups occur at molecular chain termini, the effective network chain content resulting from the polyoxyalkylene polymer (IV) in the finally formed cured product becomes high and, thus, it becomes easy to obtain rubbery cured products high in strength, high in elongation and low in elastic modulus.

The number average molecular weight (Mn) of the polyoxyalkylene polymer (IV) is not particularly restricted but, generally, it may be within the range of 500 to 100,000. From the low polymer viscosity and/or cured product rubber elasticity viewpoint, however, it is preferably within the range of 2,000 to 60,000, more preferably within the range of 5,000 to 30,000. The number average molecular weight of the polyoxyalkylene polymer (IV), so referred to herein, is the value determined by gel permeation chromatography (GPC) on the polystyrene equivalent basis. The molecular weight distribution (Mw/Mn) is desirably narrow, preferably not wider than 1.6, from the workability and/or cured product elongation viewpoint.

The crosslinkable silyl group-containing polyoxyalkylene polymer (IV) is preferably prepared by introducing a crosslinkable silyl group into a functional group-containing polyoxyalkylene polymer.

The functional group-containing polyoxyalkylene polymer can be obtained by the conventional method of polymerization (anionic polymerization using a caustic alkali) for producing polyoxyalkylene polymers or by the chain extension reaction method using this polymer as the raw material or, further, by polymerization techniques using a porphyrin-aluminum complex catalyst as typically described in Japanese Kokai Publication Sho-61-197631, Japanese Kokai Publication Sho-61-215622, Japanese Kokai Publication Sho-61-215623, Japanese Kokai Publication Sho-61-218632 and the like, a double metal cyanide complex catalyst as typically disclosed in Japanese Kokoku Publication Sho-46-27250 and Japanese Kokoku Publication Sho-59-15336, or a polyphosphazene salt catalyst as typically disclosed in Japanese Kokai Publication Hei-10-273512, among others. For practical purposes, the technique employing a double metal cyanide complex catalyst is preferred. The molecular weight distribution of the crosslinkable silyl group-containing oxyalkylene polymer (IV) is dependent on the molecular weight distribution of the precursor polymer prior to introduction of the crosslinkable silyl group and, therefore, the molecular weight distribution of the precursor polymer is preferably as narrow as possible.

The introduction of crosslinkable silyl groups can be achieved by a known technique. Thus, for example, the following techniques can be mentioned.

(F) An oxyalkylene polymer having functional group such as hydroxyl group at molecular terminus is reacted with an organic compound having both an active group reactive with the above functional group and an unsaturated group. To the obtained reaction product is then added a crosslinkable silyl group-containing hydrosilane compound in the presence of a hydrosilylation catalyst in order to introduce a crosslinkable silyl group into the polymer terminus.

(G) An oxyalkylene polymer having a hydroxyl, epoxy, isocyanato, or the like functional group (hereinafter referred to as Z functional group) at a molecular terminus is reacted with a silicon compound having both a functional group (hereinafter referred to as Z' functional group) which is reactive with said Z functional group and a crosslinkable silyl group in order to introduce a crosslinkable silyl group into the polymer terminus.

As the silicon compound having both the above Z' functional group and a crosslinkable silyl group, there can be mentioned, but not particularly limited to, amino group-containing silanes such as N-(β-aminoethyl)-γ-aminopropyltrimethoxysilane, N-(β-aminoethyl)-γ-aminopropylmethyldimethoxysilane and γ-aminopropyltriethoxysilane; mercapto group-containing silanes such as γ-mercaptopropyltrimethoxysilane and γ-mercaptopropylmethyldimethoxysilane; epoxysilanes such as γ-glycidoxypropyltrimethoxysilane and 2-(3,4-epoxycyclohexyl) ethyltrimethoxysilane; vinyl type unsaturation-containing silanes such as vinyltriethoxysilane, γ-methacryloyloxypropyltrimethoxysilane, and γ-acryloyloxypropylmethyldimethoxysilane; chlorine atom-containing silanes such as γ-chloropropyltrimethoxysilane; isocyanato group-containing silanes such as γ-isocyanatopropyltriethoxysilane, and γ-isocyanatopropylmethyldimethoxysilane; and hydrosilanes such as methyldimethoxysilane, trimethoxysilane, and methyldiethoxysilane; among others.

Among the methods described above, the method (F) or the method (G) according to which a hydroxyl group-terminated polyoxyalkylene polymer is reacted with an isocyanato group- and crosslinkable silyl group-containing compound is preferred from the economy and/or efficient reaction progress viewpoint.

The polyoxyalkylene polymer (IV) may contain an acryl-modified polyoxyalkylene polymer in order to provide weather resistance and pressure sensitive adhesiveness. The acryl-modified polyoxyalkylene polymer is a polyoxyalkylene polymer obtained by blending copolymers composed of radical-polymerized alkyl(meth)acrylate monomers.

The polyoxyalkylene polymer (IV) is used in an amount preferably within the range of 0 to 1,000 parts by weight, more preferably within the range of 0 to 400 parts by weight, per 100 parts by weight of the vinyl polymer (I). When the polyoxyalkylene polymer (IV) amounts to 0 part by weight, namely when it is not used, the weather resistance is very good. When the polyoxyalkylene polymer (IV) is used in combination, the workability is improved and the elongation at break and the tearing strength of the cured product is increased and, therefore, the composition becomes suited for use as a sealing material and gasket.

<<Tin Curing Catalyst (V)>>

A tin curing catalyst (V) may further be incorporated in the curable composition of the present invention.

As examples of the tin curing catalyst (V), there may be mentioned, among others, dialkyltin carboxylates such as dibutyltin dilaurate, dibutyltin diacetate, dibutyltin diethylhexanolate, dibutyltin dioctoate, dibutyltin di(methyl maleate), dibutyltin di(ethyl maleate), dibutyltin di(butyl maleate), dibutyltin di(isooctyl maleate), dibutyltin di(tridecyl maleate), dibutyltin di(benzyl maleate), dibutyltin maleate, dioctyltin diacetate, dioctyltin distearate, dioctyltin dilaurate, dioctyltin di(ethyl maleate) and dioctyltin di(isooctyl maleate); dialkyltin oxides, for example dibutyltin oxide, dioctyltin oxide, and mixtures of dibutyltin oxide and a phthalate ester; reaction products derived from a tetravalent tin compound, for example an dialkyltin oxides or dialkyltin diacetate, and a hydrolyzable silyl group-containing low-molecular-weight silicon compound, for example tetraethoxysilane, methyltriethoxysilane, diphenyldimethoxysilane or phenyltrimethoxysilane; bivalent tin compound such as stannous octylate, stannous naphthenate and stannous stearate; monoalkyltins, for example monobutyltin compounds such as monobutyltin trisoctoate and monobutyltin triisopropoxide, and monooctyltin compounds; reaction products and mixtures derived from an amine compound and an organotin compound, for example the reaction product derived from or mixtures of laurylamine and stannous octylate; chelate compounds such as dibutyltin bisacetylacetonate, dioctyltin bisacetylacetonate, dibutyltin bisethylacetonate and dioctyltin bisethylacetonate; tin alcoholates such as dibutyltin dimethylate, dibutyltin diethylate, dioctyltin dimethylate and dioctyltin diethylate; and the like.

Among those mentioned above, dibutyltin bisacetylacetonate and like chelate compounds and tin alcoholates are highly active as silanol condensation catalysts and, therefore, are preferred. Dibutyltin dilaurate is preferred because of the low coloration of the curable composition obtained therefrom, low cost and ready availability.

These tin curing catalysts (V) may be used singly or two or more of them may be used in combination.

The level of addition of such tin curing catalyst (V) is preferably about 0.1 to 20 parts by weight, more preferably 0.5 to 10 parts by weight, per 100 parts by weight of the vinyl polymer (I). When the addition level of the tin curing catalyst is less than 0.1 part by weight, the effect of the curing catalyst can hardly be exerted to a satisfactory extent in some cases.

Conversely, when the level of addition of the tin curing catalyst exceeds 20 parts by weight, local heat generation and/or foaming may occur in the step of curing, making it difficult to obtain good cured products; in addition, the pot life becomes excessively short, and the workability tends to deteriorate.

<<Curable Composition>>

In the curable composition of the invention, a curing catalyst and/or a curing agent appropriate for the respective crosslinkable functional group species are/is sometimes required. There may further be incorporated one or more of compounding ingredients according to the physical properties desired.

<Curing Catalyst, Curing Agent>

The crosslinkable silyl group-containing polymer is crosslinked and cured under siloxane bond formation in the presence or absence of various condensation catalysts known in the art. The properties of the cured products can widely range from rubber-like to resinous ones according to the molecular weight and main chain skeleton of the polymer.

As examples of such condensation catalyst except for the above-mentioned tin curing catalysts (V), there may be mentioned, among others, titanate esters such as tetrabutyl titanate and tetrapropyl titanate; organoaluminum compounds such as aluminum trisacetylacetonate, aluminum tris(ethyl acetoacetate) and diisopropoxyalminium ethyl acetoacetate; chelate compounds such as zirconium tetraacetylacetonate and titanium tetraacetylacetoante; lead octylate; amine compounds such as butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole and 1,8-diazabicyclo[5.4.0]undecene-7 (DBU), or salts of these amine compounds with carboxylic acids; low-molecular-weight polyamide resins obtained from a polyamine in excess and a polybasic acid; reaction products from a polyamine in excess and an epoxy compound; amino group-containing silane coupling agents such as γ-aminopropyltrimethoxysilane and N-(β-aminoethyl)-γ-aminopropylmethyldimethoxysilane; and like silanol condensation catalysts and, further, other known silanol condensation catalysts such as acidic catalysts and basic catalysts.

These catalysts may be used singly or two or more of them may be used in combination. These catalysts may also be used in combination with the tin curing catalyst (V). The level of addition of such condensation catalyst is preferably about 0.1 to 20 parts by weight, more preferably 0.5 to 10 parts by weight, per 100 parts by weight of the vinyl polymer (I). When the addition level of the condensation catalyst is less than 0.1 part by weight, the effect of the condensation catalyst can hardly be exerted to a satisfactory extent in some cases.

Conversely, when the level of addition of the condensation catalyst exceeds 20 parts by weight, local heat generation and/or foaming may occur in the step of curing, making it difficult to obtain good cured products; in addition, the pot life becomes excessively short, and the workability tends to deteriorate.

For further increasing the activity of the condensation catalyst in the curable composition of the present invention, a silanol group-free silicon compound represented by the general formula 23:

$$(R^{27}{}_{c}Si(OR^{28})_{4-c}) \quad (23)$$

(wherein $R^{27}$ and $R^{28}$ each independently is a substituted or unsubstituted hydrocarbon group containing 1 to 20 carbon atoms; when two or more groups $R^{27}$ or $R^{28}$ are present, they may be the same or different; and c is 0, 1, 2 or 3) may be added to the composition.

The above silicon compound is not restricted but those compounds of the general formula 23 in which $R^{27}$ is an aryl group containing 6 to 20 carbon atoms, such as phenyltrimethoxysilane, phenylmethyldimethoxysilane, phenyldimethylmethoxysilane, diphenyldimethoxysilane, diphenyldiethoxysilane and triphenylmethoxysilane, are preferred since their accelerating effect on the curing reaction of the composition is significant. In particular, diphenyldimethoxysilane and diphenyldiethoxysilane are low in cost and readily available, hence are most preferred.

The level of addition of this silicon compound is preferably about 0.01 to 20 parts by weight, more preferably 0.1 to 10 parts by weight, per 100 parts by weight of the vinyl polymer (I). When the level of addition of the silicon compound is below this range, the curing reaction-accelerating effect may decrease in certain cases. When, conversely, the level of addition of the silicon compound exceeds this range, the hardness and/or tensile strength of the cured products may fall.

<Adhesion Promoter>

A silane coupling agent and/or an adhesion promoter other than silane coupling agents may be incorporated in the curable composition of the invention. By adding an adhesion promoter, it becomes possible to further reduce the possibility that the sealant will peel off from the adherend, such as a siding board, as a result of changes in joint width due to external forces. In some cases, it becomes unnecessary to use a primer for improving the adhesion; simplification of construction works is thus expected.

As specific examples of the silane coupling agent, there may be mentioned isocyanato group-containing silanes such as γ-isocyanatopropyltrimethoxysilane, γ-isocyanatopropyltriethoxysilane, γ-isocyanatopropylmethyldiethoxysilane and γ-isocyanatopropylmethyldimethoxysilane; amino group-containing silanes such as γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane, N-(β-aminoethyl)-γ-aminopropylmethyldimethoxysilane, N-(β-aminoethyl)-γ-aminopropyltriethoxysilane, N-(β-aminoethyl)-γ-aminopropylmethyldiethoxysilane, γ-ureidopropyltrimethoxysilane, N-phenyl-γ-aminopropyltrimethoxysilane, N-benzyl-γ-aminopropyltrimethoxysilane and N-vinylbenzyl-γ-aminopropyltriethoxysilane; mercapto group-containing silanes such as γ-mercaptopropyltrimethoxysilane, γ-mercaptopropyltriethoxysilane, γ-mercaptopropylmethyldimethoxysilane and γ-mercaptopropylmethyldiethoxysilane; epoxy group-containing silanes such as γ-glycidoxypropyltrimethoxysilane, γ-glycidoxypropyltriethoxysilane, γ-glycidoxypropylmethyldimethoxysilane, 2-(3,4-epoxycyclohexyl)ethyltrimethoxysilane and 2-(3,4-epoxycyclohexyl)ethyltriethoxysilane; carboxysilanes such as β-carboxyethyltriethoxysilane, β-carboxyethylphenylbis(2-methoxyethoxy)silane, N-β-(carboxymethyl)aminoethyl-γ-aminopropyltrimethoxysilane, vinylic unsaturated group-containing silanes such as vinyltrimethoxysilane, vinyltriethoxysilane, γ-methacryloyloxypropylmethyldimethoxysilane and γ-acryloyloxypropylmethyltriethoxysilane; halogen-containing silanes such as γ-chloropropyltrimethoxysilane; isocyanuratosilanes such as tris(trimethoxysilyl)isocyanurate, and the like. Modification derivatives of these, for example amino-modified silyl polymers, silylated aminopolymers, unsaturated aminosilane complexes, phenylamino-long chain alkylsilanes, aminosilylated silicones, silylated polyesters and the like, can also be used as silane coupling agents.

The silane coupling agent is used, per 100 parts by weight of the vinyl polymer (I), preferably in an amount within the range of 0.1 to 20 parts by weight, more preferably 0.5 to 10 parts by weight.

As for the effect of the silane coupling agent added to the curable composition of the invention, it produces marked adhesive property improving effects under non-primer or primer-treated conditions when the composition is applied to various adherend materials, namely inorganic materials such as glass, aluminum, stainless steel, zinc, copper and mortar, or organic materials such as polyvinyl chloride, acrylics, polyesters, polyethylene, polypropylene and polycarbonates. When it is used under non-primer conditions, the improving effects on the adhesiveness to various adherends are particularly remarkable.

Specific examples other than the silane coupling agent include, but are not particularly limited to, epoxy resins, phenol resins, sulfur, alkyl titanates and aromatic polyisocyanates, among others.

The adhesion promoters specifically mentioned above may be used singly or two or more of them may be used in admixture.

By adding these adhesion promoters, it is possible to improve the adhesiveness to adherends. Among the adhesion promoters mentioned above, silane coupling agents are preferably used in combination in an amount of 0.1 to 20 parts by weight to improve the adhesion, in particular the adhesion to the metal adherend surface such as the oil pan surface, although this is not critical.

<<Plasticizer>>

One or more of various plasticizers may be incorporated in the curable composition of the invention. The use of a plasticizer in combination with a filler, which is described later herein, can make it possible to increase the elongation of cured products and/or incorporate a large amount of a filler in the curable composition, hence is advantageous but not critical.

The plasticizers are not particularly restricted but may be selected from among the following ones according to the purpose of adjusting physical and other properties: phthalate esters such as dibutyl phthalate, diheptyl phthalate, di(2-ethylhexyl)phthalate, diisodecyl phthalate and butyl benzyl phthalate; nonaromatic dibasic acid esters such as dioctyl adipate, dioctyl sebacate, dibutyl sebacate and isodecyl succinate; aliphatic esters such as butyl oleate and methyl acetylricinoleate; polyalkylene glycol esters such as diethylene glycol dibenzoate, triethylene glycol dibenzoate and pentaerythritol esters; phosphate esters such as tricresyl phosphate and tributyl phosphate; trimellitate esters; polystyrenes such as polystyrene and poly-α-methylstyrene; polybutadiene, polybutene, polyisobutylene, butadiene-acrylonitrile copolymers, polychloroprene; chlorinated paraffins; alkyldiphenyls, partially hydrogenated terphenyl and like hydrocarbon oils; process oils; polyethers including polyether polyols such as polyethylene glycol, polypropylene glycol and polytetramethylene glycol and derivatives of such polyether polyols as resulting from conversion of the hydroxyl group(s) thereof to an ester group, an ether group or like group; epoxy plasticizers such as epoxidized soybean oil and benzyl epoxystearate; polyester type plasticizers obtained from a dibasic acid such as sebacic acid, adipic acid, azelaic acid or phthalic acid and a dihydric alcohol such as ethylene glycol, diethylene glycol, triethylene glycol, propylene glycol or dipropylene glycol; acrylic plasticizers; other vinyl polymers obtained by polymerizing a vinyl monomer(s) by various methods of polymerization; and the like.

By adding a high-molecular-weight plasticizer, which is a polymer having a number average molecular weight of 500 to 15,000, it becomes possible to adjust the viscosity and/or slump tendency of the curable composition as well as the mechanical properties, such as tensile strength and elongation, of the cured products obtained by curing that composition and, further, as compared with the cases where a low-molecular-weight plasticizer containing no polymer component within the molecule is used, it becomes possible to maintain the initial physical properties for a long period of time. In the case of outdoor and the like use, plasticizer bleeding out onto the surface is prevented and, accordingly, dust hardly adhere to the surface and, also in the case of application of a paint or the like to the surface of the curable composition, coat film softening or coat film staining resulting therefrom hardly occurs and, therefore, the beautiful view can be maintained for a long period of time. This high-molecular-weight plasticizer may have a functional group(s) or may not have any functional group, without any limitation.

The number average molecular weight of the above-mentioned high-molecular-weight plasticizer, which may be within the range of 500 to 15,000, as mentioned above, is preferably 800 to 10,000, more preferably 1,000 to 8,000. When the molecular weight is too low, the plasticizer will flow out upon exposure to heat and/or rain with the lapse of time, failing to maintain the initial physical properties for a long period of time. When the molecular weight is excessively high, the viscosity increases, and the workability deteriorates.

Among these high-molecular-weight plasticizers, ones compatible with the vinyl polymer (I) are preferable. Among these, vinyl polymers are preferable from the viewpoint of compatibility, weather resistance and heat resistance. Among vinyl polymers, (meth)acrylic polymers are preferred and acrylic polymers are further preferred. These acrylic polymers include, among others, conventional ones obtainable by solution polymerization, solventless acrylic polymers and the like. The latter acrylic plasticizers are more suited for the purpose of the present invention since they are produced by high-temperature continuous polymerization techniques (U.S. Pat. No. 4,414,370, Japanese Kokai Publication Sho-59-6207, Japanese Kokoku Publication Hei-05-58005, Japanese Kokai Publication Hei-01-313522, U.S. Pat. No. 5,010, 166), without using any solvent or chain transfer agent. Examples thereof are not particularly restricted but include, among others, ARUFON UP-1000, UP-1020, UP-1110 and the like (these three are products of Toagosei Co., Ltd.), JDX-P1000, JDX-P1110, JDX-P1020 and the like (these three are products of Johnson Polymer Corporation), and the like. Mention may of course be made of the living radical polymerization technique as another method of synthesis. This technique is preferred, since it can give polymers with a narrow molecular weight distribution and a reduced viscosity and, furthermore, the atom transfer radical polymerization technique is more preferred, although the polymerization technique is not limited to those mentioned above.

The molecular weight distribution of the high-molecular-weight plasticizer is not particularly restricted but it is preferably narrow, namely lower than 1.8, more preferably not higher than 1.7, still more preferably not higher than 1.6, still further preferably not higher than 1.5, particularly preferably not higher than 1.4, most preferably not higher than 1.3.

The plasticizers, including the high-molecular-weight plasticizers mentioned above, may be used singly or two or more of them may be used in combination, although the use thereof is not always necessary. If necessary, it is also possible to use a high-molecular-weight plasticizer and, further, a low-molecular-weight plasticizer in combination unless the physical properties are adversely affected.

The incorporation of such a plasticizer(s) may also be done on the occasion of polymer production.

When a plasticizer is used, the amount thereof is not restricted but generally 5 to 800 parts by weight, preferably 10 to 600 parts by weight, more preferably 10 to 500 parts by weight, per 100 parts by weight of the vinyl polymer (I). When it is smaller than 5 parts by weight, the plasticizing effect tends to be hardly produced and, when it exceeds 800 parts by weight, the mechanical strength of cured products tends to become insufficient.

<Filler>

In the curable composition of the invention, there may be incorporated one or more of various fillers, according to need, as long as the curable composition obtained therefrom is transparent.

Specifically, there may be mentioned high-purity fused quartz glass filler microparticles, high-purity crystalline quartz fillers and the like, and FUSELEX and CRYSTALITE of TATSUMORI Co., Ltd., and the like may be mentioned as commercial products.

When a filler is used, the filler is preferably used in an amount within the range of 0 to 400 parts by weight, more preferably within the range of 0 to 250 parts by weight, particularly preferably within the range of 0 to 100 parts by weight, per 100 parts by weight of the vinyl polymer (I). When the addition level exceeds 400 parts by weight, the workability of the curable composition may deteriorate.

Those fillers may be used singly or two or more of them may be used in combination.

<Physical Property Modifier>

In the curable composition of the invention, there may be incorporated a physical property modifier capable of adjusting the tensile properties of the resulting cured products, according to need.

The physical property modifiers are not particularly restricted but include, for example, alkylalkoxysilanes such as methyltrimethoxysilane, dimethyldimethoxysilane, trimethylmethoxysilane and n-propyltrimethoxysilane; alkylisopropenoxysilanes such as dimethyldiisopropenoxysilane, methyltriisopropenoxysilane, γ-glycidoxypropylmethyldiisopropenoxysilane, functional group-containing alkoxysilanes such as γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane and γ-mercaptopropylmethyldimethoxysilane; silicone varnishes; polysiloxanes; and the like. By using such as a physical property modifier, it is possible to increase the hardness of the cured products after curing of the curable composition of the invention or decrease such hardness and attain extensibility. Such physical property modifiers as mentioned above may be used singly or two or more of them may be used in combination.

The content of the physical property modifier is not particularly restricted but the physical property modifiers can be used preferably in an amount within the range of 0.1 to 80 parts by weight, more preferably 0.1 to 50 parts by weight, per 100 parts by weight of the vinyl polymer (I). When this amount is smaller than 0.1 part by weight, the weight-reducing effect is slight and, when it exceeds 80 parts by weight, decreases in tensile strength, among the mechanical properties after curing of the formulations, are observed in some instances.

<Silanol-Containing Compound>

A silanol-containing compound may optionally be added into the curable composition of the present invention.

The silanol-containing compound means a compound having one silanol group in a molecule and/or a compound capable of forming a compound having one silanol group in a molecule by a reaction with moisture. When these compounds are used, only one of the above two compounds may be used, or both of them may be used simultaneously.

The compounds having one silanol group in a molecule is not particularly restricted. Among others, there may be mentioned compounds which can be represented by the formula (R")$_3$SiOH (wherein R"s are the same or different kind of substituted or non-substituted alkyl or aryl group), for example, the following compounds:

(CH$_3$)$_3$SiOH, (CH$_3$CH$_2$)$_3$SiOH, (CH$_3$CH$_2$CH$_2$)$_3$SiOH, (n-Bu)$_3$SiOH, (sec-Bu)$_3$SiOH, (t-Bu)$_3$SiOH, (t-Bu)Si(CH$_3$)$_2$OH, (C$_5$H$_{11}$)$_3$SiOH, (C$_6$H$_{13}$)$_3$SiOH, (C$_6$H$_5$)$_3$SiOH, (C$_6$H$_5$)$_2$Si(CH$_3$)OH, (C$_6$H$_5$)Si(CH$_3$)$_2$OH, (C$_6$H$_5$)$_2$Si(C$_2$H$_5$)OH, C$_6$H$_5$Si(C$_2$H$_5$)$_2$OH, C$_6$H$_5$CH$_2$Si(C$_2$H$_5$)$_2$OH, C$_{10}$H$_7$Si(CH$_3$)$_2$OH, (wherein C$_6$H$_5$ represents phenyl group and C$_{10}$H$_7$ represents a naphthyl group;

silanol group-containing cyclic polysiloxanes compounds, for example, the following compounds;

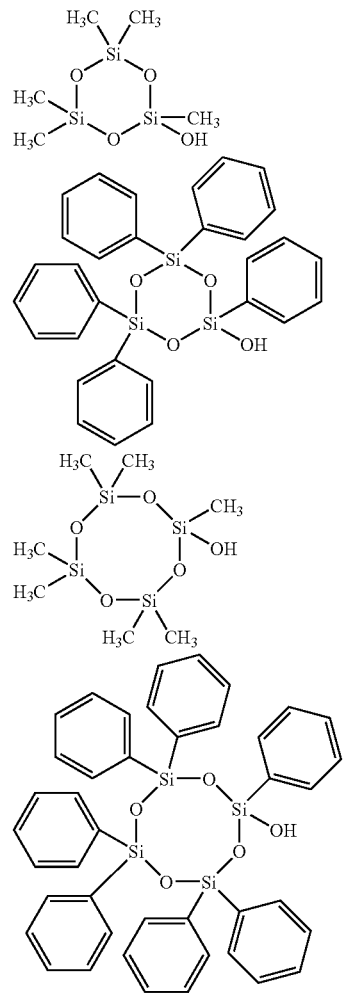

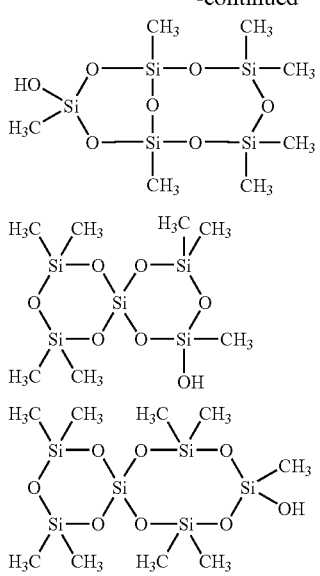

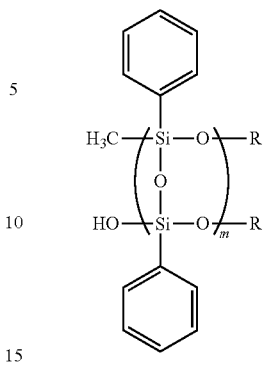

silanol group-containing chain polysiloxanes compounds, for example, the following compounds:

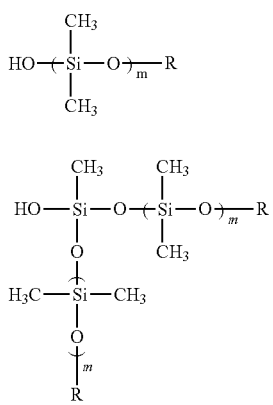

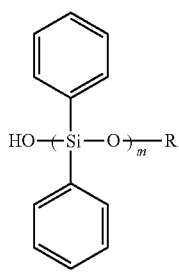

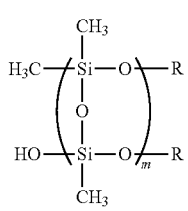

(wherein R is the same as the definition for $R^{29}$; and m is a positive number):

compounds the polymer main chain of which is composed of silicon and carbon atoms and in which a silanol group is bonded at the molecular terminus, for example, the following compounds:

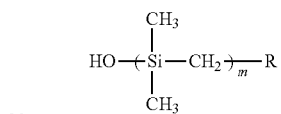

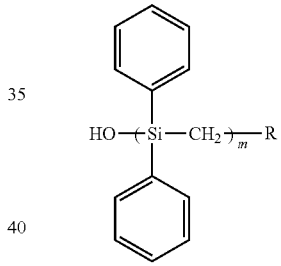

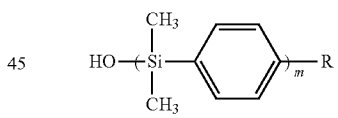

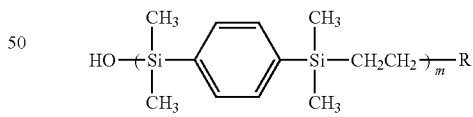

(wherein R is the same as the definition for $R^{29}$; and m is a positive number):

compounds in which silanol group is bonded to the main chain of polysilane at a molecular terminus, for example, the following compounds:

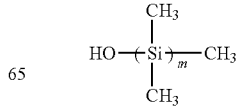

-continued

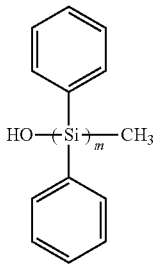

(wherein m is a positive number):
and compounds the polymer main chain of which is composed of silicon, carbon and oxygen atoms and in which a silanol group is bonded at the molecular terminus, for example, the following compounds:

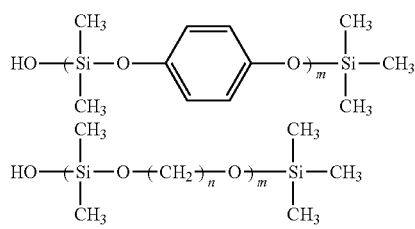

(wherein each of m and n is a positive number): and the like. Among them, the compounds represented by the following general formula (24) are preferred.

$$(R^{29})_3SiOH \quad (24)$$

(wherein $R^{29}$ represents a univalent hydrocarbon group containing 1 to 20 carbon atoms, and a plurality of $R^{29}$ may be the same or different).

$R^{29}$ is preferably methyl, ethyl, vinyl, t-butyl or phenyl group, and, in view of ready availability and effects, more preferably methyl group.

It is presumed that flexibility of a cured product is given by a reaction of a compound having one silanol group in one molecule with a crosslinkable silyl group of the vinyl polymer (I) or a siloxane bond formed by crosslinking, to thereby reduce crosslinking points.

The compounds capable of forming a compound having one silanol group in a molecule by a reaction with moisture are not particularly restricted, but are preferably compounds in which the compound having one silanol group in a molecule formed by a reaction with moisture (the compound is a hydrolysis product) is represented by the general formula (24). For example, the following compounds may be mentioned in addition to the compounds represented by the general formula (25), as described below. However, these are not particularly limitative. Such compounds which may be suitably used are N,O-bis(trimethylsilyl)acetamide, N-(trimethylsilyl)acetamide, bis(trimethylsilyl)trifluoroacetamide, N-methyl-N-trimethylsilyltrifluoroacetamide, bis(trimethylsilyl)urea, N-(t-butyldimethylsilyl)N-methyltrifluoroacetamide, (N,N-dimethylamino)trimethylsilane, (N,N-diethylamino)trimethylsilane, hexamethyldisilazane, 1,1,3,3-tetramethyldisilazane, N-(trimethylsilyl)imidazole, trimethylsilyltrifluoromethanesulfonate, trimethylsilylphenoxide, trimethylsilylated product of n-octanol, trimethylsilylated product of 2-ethylhexanol, tris(trimethylsilyl)ated product of glycerin, tris(trimethylsilyl)ated product of trimethylolpropane, tris(trimethylsilyl)ated product of pentaerythritol, tetra(trimethylsilyl)ated product of pentaerythritol, $(CH_3)_3SiNHSi(CH_3)_3$, $(CH_3)_3SiNSi(CH_3)_2$, and the following compounds:

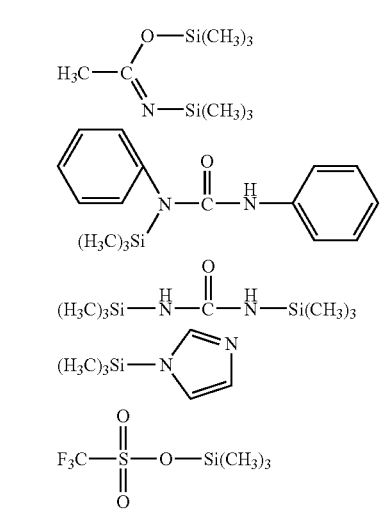

Among them, $(CH_3)_3SiNHSi(CH_3)_3$ is particularly preferred in view of an amount of contained silanol group in a hydrolysis product.

Furthermore, compounds capable of forming a compound having one silanol group in a molecule by a reaction with moisture are not particularly restricted, but the compounds represented by the following general formula (25) are preferred in addition to the above compounds:

$$((R^{29})_3SiO)_qR^{30} \quad (25)$$

(wherein $R^{29}$ is as defined above; q represents a positive number; and $R^{30}$ represents a group exclusive of a part of or all of the active hydrogen from an active hydrogen-containing compound). $R^{29}$ is preferably methyl, ethyl, vinyl, t-butyl, or phenyl group, and more preferably methyl group.

$(R^{29})_3SiO$ group is preferably trimethylsilyl group in which all three $R^{29}$s are methyl group, and q is preferably 1 to 5.

Active hydrogen-containing compounds, which are origins of the above $R^{30}$, are not particularly restricted, but includes, among others, alcohols such as methanol, ethanol, n-butanol, i-butanol, t-butanol, n-octanol, 2-ethylhexanol, benzyl alcohol, ethylene glycol, diethylene glycol, polyethylene glycol, propylene glycol, dipropylene glycol, polypropylene glycol, propanediol, tetramethylene glycol, polytetramethylene glycol, glycerin, trimethylolpropane and pentaerythritol; phenols such as phenol, cresol, bisphenol A and hydroquinone; carboxylic acids such as formic acid, acetic acid, propionic acid, lauric acid, palmitic acid, stearic acid, behenic acid, acrylic acid, methacrylic acid, oleic acid, linolic acid, linolenic acid, sorbic acid, oxalic acid, malonic acid, succinic acid, adipic acid, maleic acid, benzoic acid, phthalic acid, terephthalic acid and trimellitic acid; ammonia; amines such as methylamine, dimethylamine, ethylamine, diethylamine, n-butylamine and imidazole; acid amides such as acetamide and benzamide; ureas such as urea and N,N'-diphenylurea; and ketones such as acetone, acetylketone and 2,4-heptadione.

Although it is not particularly limited, a compound capable of forming a compound having one silanol group in a molecule by a reaction with moisture, represented by the above general formula (25), is obtainable by, for example, subjecting the above-mentioned active hydrogen-containing compound or the like to the reaction with the compound having a group capable of reacting with the active hydrogen, such as halogen group, together with a $(R^{29})_3Si$ group, which is sometimes referred to as "silylating agent", such as trimethylsilyl chloride or dimethyl(t-butyl)silylchloride. In the above description, $R^{29}$ is the same one as defined above.

The compounds represented by the general formula (25) includes allyloxytrimethylsilane, N,O-bis(trimethylsilyl)acetamide, N-(trimethylsilyl)acetamide, bis(trimethylsilyl)trifluoroacetamide, N-methyl-N-trimethylsilyltrifluoroacetamide, bis(trimethylsilyl)urea, N-(t-butyldimethylsilyl)N-methyltrifluoroacetamide, (N,N-dimethylamino)trimethylsilane, (N,N-diethylamino)trimethylsilane, hexamethyldisilazane, 1,1,3,3,-tetramethyldisilazane, N-(trimethylsilyl)imidazole, trimethylsilyltrifluoromethanesulfonate, trimethylsilylphenoxide, trimethylsilylated product of n-octanol, trimethylsilylated product of 2-ethylhexanol, tris(trimethylsilyl)ated product of glycerin, tris(trimethylsilyl)ated product of trimethylolpropane, tris(t-rimethylsilyl)ated product of pentaerythritol, tetra(trimethylsilyl)ated product of pentaerythritol, and the like. These may be used singly or in combination of two or more.

Additionally, the compounds which may be represented by the general formula $((R^{31})_3SiO)(R^{32}O)_s)_tD$, $CH_3O(CH_2CH(CH_3)O)_5Si(CH_3)_3$, $CH_2\!=\!CHCH_2(CH_2CH(CH_3)O)_5Si(CH_3)_3$, $(CH_3)_3SiO(CH_2CH(CH_3)O)_5Si(CH_3)_3$, and $(CH_3)_3SiO(CH_2CH(CH_3)O)_7Si\,(CH_3)_3$
(wherein $R^{31}$ represents the same or different kind of substituted or unsubstituted univalent hydrocarbon group; $R^{32}$ is an bivalent hydrocarbon group containing 1 to 8 carbon atoms; s and t are positive numbers, t is 1 to 6 and s times t is not less than 5; and D is an mono- to hexa-valent organic group) are also suitably used. These may be used singly or in combination of two or more.

Among the compounds capable of forming a compound having one silanol group in a molecule by a reaction with moisture, the active hydrogen compounds which is formed after hydrolysis are preferably phenols, acid amides and alcohols since there are no adverse affects on storage stability, weatherability or the like. More preferred are phenols and alcohols, in which the active hydrogen compound is a hydroxyl group.

Among the above compounds, preferred are N,O-bis(trimethylsilyl)acetamide, N-(trimethylsilyl)acetamide, trimethylsilylphenoxide, trimethylsilylated product of n-octanol, trimethylsilylated product of 2-ethylhexanol, tris(trimethylsilyl)ated product of trimethylolpropane, tris(trimethylsilyl)ated product of pentaerythritol, tetra(trimethylsilyl)ated product of pentaerythritol, and the like.

The compounds capable of forming a compound having one silanol group in a molecule by a reaction with moisture produces the compound having one silanol group in a molecule by reacting with moisture during storage, at the time of curing, or after curing. It is presumed that flexibility of a cured product is given by a reaction of the thus-formed compound having one silanol group in a molecule with a crosslinkable silyl group of the vinyl polymer (I) or a siloxane bond formed by crosslinking, to thereby reduce crosslinking points.

The addition level of the silanol-containing compound can be properly adjusted depending on the expected physical properties of the cured product. The addition level of the silanol-containing compound is 0.1 to 50 parts by weight, preferably 0.3 to 20 parts by weight and still more preferably 0.5 to 10 parts by weight, per 100 parts by weight of the vinyl polymer (I). When the level is below 0.1 parts by weight, the effects caused by addition may not appear, and on the contrary, when it exceeds 50 parts by weight, crosslinking may be insufficient and strength or gel fraction ratio of the cured product tend to deteriorate.

The time to add the silanol compound into the vinyl polymer (I) is not particularly restricted, but it may be added in the production process of the vinyl polymer (I), or may be added in the preparation process of a curable composition.
<Thixotropic Agent (Antisagging Agent)>

If necessary, a thixotropic agent (antisagging agent) may be added to the curable composition of the invention to prevent sagging and improve the workability.

The thixotropic agents (antisagging agents) are not particularly restricted but include, for example, polyamide waxes, hydrogenated castor oil derivatives; metal soaps such as calcium stearate, aluminum stearate and barium stearate, and the like. These thixotropic agents (antisagging agent) may be used singly or two or more of them may be used in combination.

The addition level of the thixotropic agent is 0.1 to 50 parts by weight, and preferably 0.2 to 25 parts by weight, per 100 parts by weight of the vinyl polymer (I). When the level is below 0.1 parts by weight, the thixotropic effects may not appear sufficiently, and on the contrary, when it exceeds 50 parts by weight, viscosity of the formulation may increase and storage stability of the formulation tends to deteriorate.
<Photocurable Substance>

To the curable composition of the invention, there may be added a photocurable substance, according to need. The photocurable substance is a substance whose molecular structure undergoes a chemical change in a short time under the action of light and which thus causes changes of physical properties such as curing. By adding such photocurable substance, it becomes possible to reduce the tackiness (residual tack) of the cured product surface after curing of the curable composition. This photocurable substance is a substance capable of curing upon irradiation with light. A typical photocurable substance is a substance capable of curing when allowed to stand at an indoor place in the sun (near a window) at room temperature for 1 day, for example. A large number of compounds of this type are known, including organic monomers, oligomers, resins, and compositions containing them, and they are not particularly restricted in kind but include, for example, unsaturated acrylic compounds, vinyl cinnamate polymers, azidated resins and the like.

As the unsaturated acrylic compounds, there may be specifically mentioned, for example, (meth)acrylate esters of low-molecular-weight alcohols such as ethylene glycol, glycerol, trimethylolpropane, pentaerythritol and neopentyl alcohol; (meth)acrylate esters of alcohols derived from acids such as bisphenol A, acids such as isocyanuric acid or such low-molecular-weight alcohols as mentioned above by modification with ethylene oxide and/or propylene oxide; (meth)acrylate esters of hydroxyl-terminated polyether polyols whose main chain is a polyether, polymer polyols obtained by radical polymerization of a vinyl monomer(s) in a polyol whose main chain is a polyether, hydroxyl-terminated polyester polyols whose main chain is a polyester, polyols whose main chain is a vinyl or (meth)acrylic polymer and which have hydroxyl groups in the main chain, and like polyols; epoxy acrylate oligomers obtained by reacting a bisphenol A-based, novolak type or other epoxy resin with (meth)acrylic acid; urethane acrylate type oligomers containing urethane bonds and (meth)acryl groups within the molecular chain as obtained by reacting a polyol, a polyisocyanate and a hydroxyl group-containing (meth)acrylate; and the like.

The vinyl cinnamate polymers are photosensitive resins whose cinnamoyl groups function as photosensitive groups and include cinnamic acid-esterified polyvinyl alcohol species and various other polyvinyl cinnamate derivatives.

The azidated resins are known as photosensitive resins with the azido group serving as a photosensitive group and generally include photosensitive rubber solutions with an azide compound added as a photosensitive substance and, further, detailed examples are found in "Kankosei Jushi (Photosensitive Resins)" (published Mar. 17, 1972 by Insatsu Gakkai Shuppanbu, pages 93 ff, 106 ff, 117 ff). These can be used either singly or in admixture, with a sensitizer added, if necessary.

Among the photocurable substances mentioned above, unsaturated acrylic compounds are preferred in view of their easy handleability.

The photocurable substance is preferably added in an amount of 0.01 to 30 parts by weight per 100 parts by weight of the vinyl polymer (I). At addition levels below 0.01 part by weight, the effects will be insignificant and, at levels exceeding 30 parts by weight, the physical properties may be adversely affected. The addition of a sensitizer such as a ketone or nitro compound or a promoter such as an amine can enhance the effects in some instances.

<Air Oxidation-Curable Substance>

In the curable composition of the invention, there may be incorporated an air oxidation-curable substance, if necessary.

The air oxidation-curable substance is a compound containing an unsaturated group capable of being crosslinked for curing by oxygen in the air. By adding such air oxidation-curable substance, it becomes possible to reduce the tack (also referred as residual tack) of the cured product surface on the occasion of curing of the curable composition. This air oxidation-curable substance according to the present invention is a substance capable of curing upon contacting with air and, more specifically, has a property such that it cures as a result of reaction with oxygen in the air. A typical air oxidation-curable substance can be cured upon allowing it to stand in the air in a room for 1 day, for example.

As specific examples of the air oxidation-curable substance, there may be mentioned, for example, drying oils such as tung oil and linseed oil; various alkyd resins obtained by modification of such drying oils; drying oil-modified acrylic polymers, epoxy resins, silicone resins; 1,2-polybutadiene, 1,4-polybutadiene, C5-C8 diene polymers and copolymers and, further, various modifications of such polymers and copolymers (e.g. maleinated modifications, boiled oil modifications); and the like. Among these, tung oil, liquid ones among the diene polymers (liquid diene polymers) and modifications thereof are particularly preferred.

As specific examples of the liquid diene polymers, there may be mentioned, for example, liquid polymers obtained by polymerization or copolymerization of diene compounds such as butadiene, chloroprene, isoprene and 1,3-pentadiene, NBR, SBR and like polymers obtained by copolymerization of such diene compounds (as main components) with a monomer copolymerizable therewith, such as acrylonitrile or styrene, and, further, various modification thereof (e.g. maleinated modifications, boiled oil modifications). These may be used singly or two or more of them may be used in combination. Among these liquid diene compounds, liquid polybutadiene species are preferred.

The air oxidation-curable substances may be used singly or two or more of them may be used in combination. The use of a catalyst capable of promoting the oxidation curing or a metal drier in combination with the air oxidation-curable substance can enhance the effects in certain instances. As such catalysts or metal driers, there may be mentioned, for example, metal salts such as cobalt naphthenate, lead naphthenate, zirconium naphthenate, cobalt octylate and zirconium octylate, amine compounds, and the like.

The air oxidation-curable substance is preferably added in an amount of 0.01 to 30 parts by weight per 100 parts by weight of the vinyl polymer (I). At levels below 0.01 part by weight, the effects will be insignificant and, at levels exceeding 30 parts by weight, the physical properties may be adversely affected.

<Antioxidant and Light Stabilizer>

In the curable composition of the invention, there may be incorporated an antioxidant or a light stabilizer, if necessary.

Various of antioxidants and light stabilizers are known and mention may be made of various species described, for example, in "Sankaboshizai Handbook (Handbook of Antioxidants)" published by Taiseisha LTD. and "Kobunshi Zairyo no Rekka to Anteika (Degradation and Stabilization of Polymer Materials)" (pp. 235-242) published by CMC Publishing CO., LTD. The antioxidants and light stabilizers which can be used are not limited to these, however.

As specific examples of these antioxidants, there may be mentioned, but not restricted to, for example, thioether antioxidants such as Adekastab PEP-36 and Adekastab AO-23 (both being products of Asahi Denka Co., Ltd.); phosphorus-containing antioxidants such as IRGAFOS 38, IRGAFOS 168 and IRGAFOS P-EPQ (the three being products of Ciba Specialty Chemicals); and hindered phenol antioxidants. For example, such hindered phenol compounds as enumerated below are preferred.

As specific examples of the hindered phenol compounds, the following can be mentioned.

2,6-Di-tert-butyl-4-methylphenol, 2,6-di-tert-butyl-4-ethylphenol, mono(or di or tri)(α-methylbenzyl)phenol, 2,2'-methylenebis(4-ethyl-6-tert-butylphenol), 2,2'-methylenebis (4-methyl-6-tert-butylphenol), 4,4'-butylidenebis(3-methyl-6-tert-butylphenol), 4,4'-thiobis(3-methyl-6-tert-butylphenol), 2,5-di-tert-butylhydroquinone, 2,5-di-tert-amylhydroquinone, triethylene glycol bis[3-(3-tert-butyl-5-methyl-4-hydroxyphenyl)propionate], 1,6-hexanediol bis[3-(3,5-di-tert-butyl-4-hydroxyphenyl)propionate], 2,4-bis(n-octylthio)-6-(4-hydroxy-3,5-di-tert-butylanilino)-1,3,5-triazine, pentaerythrityl tetrakis[3-(3,5-di-tert-butyl-4-hydroxyphenyl)propionate], 2,2-thiodiethylenebis[3-(3,5-di-tert-butyl-4-hydroxyphenyl)propionate], octadecyl-3-(3, 5-di-tert-butyl-4-hydroxyphenyl)propionate, N,N'-hexamethylenebis (3,5-di-tert-butyl-4-hydroxyhydrocinnamide), diethyl 3,5-di-tert-butyl-4-hydroxybenzylphosphonate, 1,3,5-trimethyl-2,4,6-tris(3,5-di-tert-butyl-4-hydroxybenzyl)benzene, bis(ethyl 3,5-di-tert-butyl-4-hydroxybenzylphosphonato)calcium, tris(3,5-di-tert-butyl-4-hydroxybenzyl)isocyanurate, 2,4-bis[(octylthio) methyl]-o-cresol, N,N'-bis[3-(3,5-di-tert-butyl-4-hydroxyphenyl)propionyl]hydrazine, tris(2,4-di-tert-butylphenyl)phosphite, 2-(5-methyl-2-hydroxyphenyl) benzotriazole, 2-[2-hydroxy-3,5-bis(α,α-dimethylbenzyl) phenyl]-2H-benzotriazole, 2-(3,5-di-tert-butyl-2-hydroxyphenyl)benzotriazole, 2-(3-tert-butyl-5-methyl-2-hydroxyphenyl)-5-chlorobenzotriazole, 2-(3,5-di-tert-butyl-2-hydroxyphenyl)-5-chlorobenzotriazole, 2-(3,5-di-tert-amyl-2-hydroxyphenyl)benzotriazole, 2-(2'-hydroxy-5'-tert-octylphenyl)benzotriazole, methyl 3-[3-tert-butyl-5-(2H-benzotriazol-2-yl)-4-hydroxyphenyl]propionate-polyethylene glycol (molecular weight about 300) condensate, hydroxyphenylbenzotriazole derivatives, bis(1, 2,2,6,6-pentamethyl-4-piperidyl)2-(3,5-di-tert-butyl-4-hydroxybenzyl)-2-n-butylmalonate, 2,4-di-tert-butylphenyl-3, 5-di-tert-butyl-4-hydroxybenzoate, and the like.

Examples of the relevant product names include, but are not limited to, Nocrac 200, Nocrac M-17, Nocrac SP, Nocrac SP-N, Nocrac NS-5, Nocrac NS-6, Nocrac NS-30, Nocrac 300, Nocrac NS-7 and Nocrac DAH (all being products of Ouchi Shinko Chemical Industrial Co., Ltd.), Adekastab AO-30, Adekastab AO-40, Adekastab AO-50, Adekastab AO-60, Adekastab AO-616, Adekastab AO-635, Adekastab AO-658, Adekastab AO-80, Adekastab AO-15, Adekastab AO-18, Adekastab 328 and Adekastab AO-37 (all being products of Asahi Denka Co., Ltd.), IRGANOX 245, IRGANOX 259, IRGANOX 565, IRGANOX 1010, IRGANOX 1024, IRGANOX 1035, IRGANOX 1076, IRGANOX 1081, IRGANOX 1098, IRGANOX 1222, IRGANOX 1330 and IRGANOX 1425WL (all being products of Ciba Specialty Chemicals), and Sumilizer GM and Sumilizer GA-80 (both being products of Sumitomo Chemical Co., Ltd.).

As specific examples of the light stabilizers, there may be mentioned, for example, benzotriazole compounds such as TINUVIN P, TINUVIN 234, TINUVIN 320, TINUVIN 326, TINUVIN 327, TINUVIN 329 and TINUVIN 213 (all being products of Ciba Specialty Chemicals), triazines such as TINUVIN 1577, benzophenone compounds such as CHIMASSORB 81, benzoate compounds such as TINUVIN 120 (all being products of Ciba Specialty Chemicals); hindered amine compounds, and the like ultraviolet absorbers.

Among them, hindered amine compounds are more preferred. As specific examples of the hindered amine compounds, the following can be mentioned, but there is no restriction, however; dimethyl succinate-1-(2-hydroxyethyl)-4-hydroxy-2,2,6,6-tetramethylpiperidine polycondensate, poly[{6-(1,1,3,3-tetramethylbutyl)amino-1,3,5-triazine-2,4-diyl}{(2,2,6,6-tetramethyl-4-piperidyl)imino}], N,N'-bis(3-aminopropyl)ethylenediamine-2,4-bis[N-butyl-N-(1,2,2,6,6-pentamethyl-4-piperidyl)amino]-6-chloro-1,3,5-triazine condensate, bis(2,2,6,6-tetramethyl-4-piperidyl)sebacate, bis(2,2,6,6-tetramethyl-4-piperidinyl)succinate and the like.

Examples of the relevant product names include, but are not limited to, TINUVIN 622LD, TINUVIN 144 and CHIMASSORB 944LD, CHIMASSORB 119FL (all being products of Ciba Specialty Chemicals), Adekastab LA-52, Adekastab LA-57, Adekastab LA-62, Adekastab LA-67, Adekastab LA-63, Adekastab LA-68, Adekastab LA-82 and Adekastab LA-87 (all being products of Asahi Denka Co., Ltd.), and Sanol LS-770, Sanol LS-765, Sanol LS-292, Sanol LS-2626, Sanol LS-1114, Sanol LS-744 and Sanol LS-440 (all being products of Sankyo Co., Ltd.), and the like.

The light stabilizer may be used in combination with the antioxidant, and such combined use enhances the effects thereof and may improve the heat resistance and the weather resistance, hence is particularly preferred. Such ready-made mixtures of an antioxidant and a light stabilizer as TINUVIN C353 and TINUVIN B75 (both being products of Ciba Specialty Chemicals) and the like may also be used.

An ultraviolet absorber and a hindered amine compound (HALS) are sometimes used in combination in order to improve the weather resistance. The combined use of may produce enhanced effects and, therefore, both may be used in combination without any particular restriction, and the combined use is sometimes favorable.

The antioxidants or light stabilizers to be used are not particularly restricted, but those having high molecular weight are preferred because they exhibit heat resistance-improving effect according to the present invention for long period of time.

The addition level of the antioxidants or the light stabilizer is preferably within the range of 0.1 to 20 parts by weight per 100 parts by weight of the vinyl polymer (I), respectively. At levels below 0.1 part by weight, the heat resistance-improving effect is insignificant, while levels exceeding 20 parts by weight make no great difference in effect any longer, hence are economically disadvantageous.

<Other Additives>

If necessary, one or more of various additives may be added to the curable composition of the invention for the purpose of adjusting various physical properties of the curable composition or cured products.

Such additives include, for example, flame retardants, curability modifiers, antioxidants, radical scavengers, metal deactivators, antiozonants, phosphorus-containing peroxide decomposers, lubricants, pigments, blowing agents and the like. These various additives may be used singly or two or more of them may be used in combination.

Specific examples of such additives are described, for example in Japanese Kokoku Publication Hei-04-69659, Japanese Kokoku Publication Hei-07-108928, Japanese Kokai Publication Sho-63-254149 and Japanese Kokai Publication Sho-64-22904.

<Production of the Curable Composition>

As described above, the curable composition according to the present invention comprises a vinyl polymer (I) the main chain of which is the product of living radical polymerization and which contains at least one crosslinkable silyl group, a micronized hydrophobic silica (II), or a graft copolymer (III) obtained by graft polymerization of a crosslinkable rubber-like acrylic ester polymer and a vinyl monomer. Alternatively, the curable composition may comprise all of the above-mentioned vinyl polymer (I), micronized hydrophobic silica (II) and graft copolymer (III). Additionally, the curable composition may further comprise a polyoxyalkylene polymer (IV) containing at least one crosslinkable silyl group and/or a tin curing catalyst (V).

The curable composition of the invention may be prepared as a one package formulation, which is to be cured by the moisture in the air after application, by compounding all the components/ingredients and tightly sealing in a container for storage, or as a two-pack type formulation by separately preparing a curing agent by compounding a curing catalyst, a filler, a plasticizer, water and the like, so that such composition and the polymer composition may be mixed together prior to use. In the case of such two-pack type, a colorant or colorants can be added on the occasion of mixing of the two compositions. Thus, in providing sealants matching in color to the given siding boards, for example, a wide assortment of colors become available with limited stocks and thus it becomes easy to cope with the market demand for many colors; this is more favorable for low buildings and the like. By mixing the colorant or colorants, for example a pigment or pigments, with a plasticizer and/or a filler, as the case may be, and using the thus-prepared paste, it becomes possible to facilitate the working process. Furthermore, it is possible to finely adjust the curing rate by adding a retarder on the occasion of mixing up the two compositions.

The curable composition of the invention thus obtained is transparent. It may be particularly preferably used as a curable composition for a transparent material.

<<Cured Product>>

<Use>

The curable composition of the present invention can be used in various fields of application which include, but are not limited to, elastic sealing materials for building and construction and sealing materials for pair glass, adhesives, elastic adhesives, coating compositions, gaskets, casting materials, various molding materials, artificial marble, rustproof and waterproof sealants for end faces (cut sections) of net glass or laminated glass, materials for vibration absorption/vibration suppression/noise reduction/seismic isolation used in an automobile, a vessel, a household electrical appliance and the like, a liquid sealing agent used in an automobile parts, an electric parts, various kinds of machine parts and the like, and the like applications. Among these, the curable composition can be more suitably used as adhesives, sealing materials, liquid gaskets and coating compositions.

BEST MODE FOR CARRYING OUT THE INVENTION

The following examples illustrate the present invention in further detail. These examples are, however, by no means limitative of the scope of the invention.

In the examples and comparative examples below, "parts" and "%" represent "parts by weight" and "% by weight", respectively.

In the examples below, the number average molecular weight and the molecular weight distribution (ratio of the weight average molecular weight to the number average molecular weight) were calculated by a standard polystyrene calibration method using gel permeation chromatography (GPC). In GPC measurement, a polystyrene-crosslinked gel column (Shodex GPC K-804; manufactured by Showa Denko K. K.) and chloroform were used as a GPC column and a mobile solvent, respectively.

Synthesis Example 1

A 2-liter flask was charged with 8.39 g (58.5 mmol) of cuprous bromide and 112 mL of acetonitrile, and the contents were heated at 70° C. with stirring under a nitrogen stream for 30 minutes. Thereto were added 17.6 g (48.8 mmol) of diethyl 2,5-dibromoadipate and 224 mL (1.56 mol) of n-butyl acrylate, and the mixture was further heated at 70° C. with stirring for 45 minutes. Thereto was added 0.41 mL (1.95 mmol) of pentamethyldiethylenetriamine (hereinafter referred to as "triamine"), and the reaction was thereby started. While continued heating at 70° C. with stirring, 895 mL (6.24 mol) of butyl acrylate was added dropwise intermittently over 160 minutes beginning at 80 minutes after start of the reaction. During this dropping, 1.84 mL (8.81 mmol) of triamine was added. After the lapse of 375 minutes after start of the reaction, 288 mL (1.95 mol) of 1,7-octadiene and 4.1 mL (19.5 mmol) of triamine were added, and the heating at 70° C. with stirring was further continued. At 615 minutes after start of the reaction, the heating was stopped. The reaction mixture was diluted with toluene and filtered, and the filtrate was heated under reduced pressure to give a polymer (polymer [1]). The polymer [1] had a number average molecular weight of 24,000 with a molecular weight distribution of 1.3. The number of alkenyl groups as determined by $^1$H-NMR spectrometry was 2.6 per polymer molecule.

In a nitrogen atmosphere, a 2-liter flask was charged with the polymer [1], 11.9 g (0.121 mol) of potassium acetate and 900 mL of N,N-dimethylacetamide (hereinafter referred to as "DMAc"), and the mixture was heated at 100° C. with stirring for 11 hours. The DMAc was removed by heating the reaction mixture under reduced pressure, toluene was added for filtration. An adsorbent (200 g, Kyowaad 700PEL, product of Kyowa Chemical) was added to the filtrate, and the mixture was heated at 100° C. with stirring under a nitrogen stream for 3 hours. The adsorbent was filtered off, and the toluene was distilled off from the filtrate under reduced pressure to give a polymer (polymer [2]).

A one-liter pressure-resistant reaction vessel was charged with the polymer [2] (648 g), dimethoxymethylhydrosilane (25.5 mL, 0.207 mol), methyl orthoformate (7.54 mL, 0.0689 mol) and platinum(0)-1,1,3,3-tetramethyl-1,3-divinyldisiloxane complex. The amount of the platinum catalyst used was such that the mole ratio thereof to the alkenyl group in the polymer amounted to $3\times10^{-3}$ equivalents. The mixture was heated at 100° C. with stirring for 2 hours. The volatile matter was then distilled off from the mixture under reduced pressure, whereby a silyl group-terminated polymer (polymer A) was obtained.

The polymer obtained had a number average molecular weight of 30,000 as determined by GPC (on the polystyrene equivalent basis) with a molecular weight distribution of 1.8. The average number of the silyl groups introduced per polymer molecule as determined by $^1$H-NMR spectrometry was 1.9.

Synthesis Example 2

An alkenyl group-terminated vinyl copolymer [3] was obtained in the same manner as in Synthesis Example 1 except that 3.40 g (23.7 mmol) of cuprous bromide, 47 mL of acetonitrile, 7.80 g (21.7 mmol) of diethyl 2,5-dibromoadipate, 368 mL (2.56 mol) of butyl acrylate, 38 mL (0.41 mol) of methyl acrylate, 77 mL (0.19 mol) of stearyl acrylate, 2.475 mL (11.86 mmol) of triamine, 141 mL of acetonitrile, 58 mL (0.40 mol) of 1,7-octadiene were used.

A silyl group-terminated n-butyl acrylate/methyl acrylate/stearyl acrylate copolymer (polymer B) was obtained using the copolymer [3] (260 g) obtained above, as well as dimethoxymethylhydrosilane (8.46 mL, 68.6 mmol), methyl orthoformate (2.50 mL, 22.9 mmol) and a platinum catalyst. The copolymer obtained had a number average molecular weight of 23,000 with a molecular weight distribution of 1.3. The average number of the silyl groups introduced per polymer molecule as determined by $^1$H-NMR spectrometry was about 1.7.

Synthesis Example 3

800 g of an allyl ether group-terminated polyoxypropylene of number average molecular weight of about 19,000 was introduced into a pressure-resistant reaction vessel equipped with a stirrer. Methyldimethoxysilane and $1\times10^{-4}$ [eq/vinyl group] of a chloroplatinate catalyst (chloroplatinate hexahydrate) were then added thereto and the resultant mixture was subjected to reaction for 2 hours at 90° C. to produce a crosslinkable silyl group-containing polyoxyalkylene polymer (polymer C) having 2.1 methyldimethoxysilyl groups, on average, in one molecule.

Example 1

To the polymer A obtained in Synthesis Example 1 (100 parts by weight), 5 parts by weight of silica hydrophobically-treated with hexamethyldisilazane (Nippon Aerosil Co., Ltd.; product name: R812; particle diameter: 0.007 μm) (as a micronized hydrophobic silica), 20 parts by weight of diisodecyl phthalate (product of New Japan Chemical Co., Ltd.; Sansocizer DIDP) (as a plasticizer), 1 part by weight of a benzotriazole-based ultraviolet absorber (Ciba Specialty Chemicals; product name: TINUVIN 213), 1 part by weight of a hindered amine-based light stabilizer (Sankyo Co., Ltd.; product name: Sanol LS765), 2 parts by weight of N-β-aminoethyl-γ-aminopropyltrimethoxysilane (Nippon Unicar Company Limited; product name: A-1120) (as an adhesion promoter), and 2 parts by weight of dibutyltin dilaurate (Sankyo Organic Chemicals Co., Ltd.; product name: STANN BL) (as a tin curing catalyst) were added, the mixture thus obtained was kneaded and defoamed under reduced pressure to generate a curable composition.

Example 2

A curable composition was obtained in the same manner as in Example 1 except that 50 parts by weight of the polymer B obtained in Synthesis Example 2 and 50 parts by weight of the polymer C obtained in Synthesis Example 3 were used in lieu of the polymer A in Example 1, 5 parts by weight of silica hydrophobically-treated with dimethyldisilicone (Nippon Aerosil Co., Ltd.; product name: RY200S; particle diameter: 0.012 μm) was used in lieu of the silica hydrophobically-treated with hexamethylsilazane, and the amount of diisodecyl phthalate was changed to 10 parts by weight.

Example 3

A curable composition was obtained in the same manner as in Example 2 except that 5 parts by weight of silica hydrophobically-treated with hexamethyldisilazane (Nippon Aerosil Co., Ltd.; product name: R812) was used in lieu of the silica hydrophobically-treated with dimethylsilicone in Example 2.

Example 4

A curable composition was obtained in the same manner as in Example 2 except that 5 parts by weight of silica hydrophobically-treated with dimethyldichlorosilane (Nippon Aerosil Co., Ltd.; product name: R972CF; particle diameter: 0.016 μm) was used in lieu of the silica hydrophobically-treated with dimethylsilicone in Example 2.

Example 5

A curable composition was obtained in the same manner as in Example 3 except that 10 parts by weight of an acrylic plasticizer (Toagosei Co., Ltd.; product name: ARUFON UP-1020) was used in lieu of diisodecyl phthalate in Example 3.

Example 6

A curable composition was obtained in the same manner as in Example 2 except that the amount of diisodecyl phthalate was increased from 10 parts by weight in Example 2 to 20 parts by weight, and 5 parts by weight of a graft copolymer (KANEKA CORPORATION; product name: Kane Ace (trademark) FM-20), which is obtained by graft copolymerization of a crosslinkable rubber-like polymer, containing butyl acrylate as a main component, with a vinyl monomer, containing methyl methacrylate and butyl acrylate as main components, was used in lieu of the silica hydrophobically-treated with dimethylsilicone.

Example 7

A curable composition was obtained in the same manner as in Example 6 except that 5 parts by weight of silica hydrophobically-treated with hexamethyldisilazane was further used.

Example 8

A curable composition was obtained in the same manner as in Example 3 except that 50 parts by weight of an acrylic-modified polyoxyalkylene polymer (KANEKA CORPORATION; product name: MS polymer S943) was used in lieu of the polymer C in Example 3.

Comparative Example 1

A curable composition was obtained in the same manner as in Example 1 except that the amount of diisodecyl phthalate was changed from 20 parts by weight in Example 1 to 10 parts by weight, and Aerosil R812, hexamethyldisilazane-treated silica, was not used.

Comparative Example 2

A curable composition was obtained in the same manner as in Example 2 except that Aerosil RY200S, dimethylsilicone-treated silica, was not used.

Comparative Example 3

A curable composition was obtained in the same manner as in Example 1 except that 100 parts by weight of MS polymer S943 was used in lieu of the polymer A in Example 1, and the amount of diisodecyl phthalate was changed from 20 parts by weight to 10 parts by weight.

Comparative Example 4

A curable composition was obtained in the same manner as in Example 2 except that 100 parts by weight of the polymer C was used in lieu of the polymer B and the polymer C.

The above-mentioned curable compositions obtained in Examples 1 to 8 and Comparative Examples 1 to 4 were subjected to the following measurements to evaluate the respective physical properties. The results are shown in Table 1.

(Transparency of the Cured Product)

Each curable composition was spread on a 2 mm-thick acrylic plate by a 5 mm spacer under the condition at 23° C. and 50% RH (relative humidity) and the acrylic plate bearing the curable composition in 5 mm thickness was put onto a newspaper and the newspaper was observed through the curable composition and the acrylic plate from above to evaluate the transparency based on the visibility of letters. The transparency was evaluated as follows.

Excellent: transparent and letters were clearly seen; Fair: although slightly cloudy, letters were readable; Poor: cloudy and letters were unreadable; and Bad: opaque and letters were unreadable.

(Adhesiveness to Polycarbonate)

Each curable composition was spread in about 5 mm-thickness onto a polycarbonate under the condition at 23° C. and 50% RH and slightly patted with a microspatula. After 1 week, an about 1 cm cut was formed at the interface between the polycarbonate and the composition with a razor and then the resulting specimen was pulled toward about 180 degree different directions and the broken state was observed. The evaluation was carried out as follows. CF means good adhesiveness.

CF: breakage of the curable composition, AF: peeling at the interface between the polycarbonate and the composition.

(Viscosity of the Curable Composition)

A 100-cc cup was filled with the curable composition with care to avoid air contamination, and the viscosities at 2 rpm and 10 rpm were measured, respectively, under the conditions of 23° C. and 50% RH using Tokimec model BH viscometer and a roter No. 7.

(Workability)

In the case where the ratio (viscosity proportion) calculated by dividing the viscosity value of the curable composition at 2 rpm by the same at 10 rpm was 1.1 or higher, the workability is determined to be excellent and in the case where the ratio was lower than 1.1, the workability was determined to be bad.

(Tensile Properties of the Cured Product)

The curable composition was molded into a sheet-shaped test specimen, about 3 mm in thickness, and the test specimen was cured at 23° C. for 3 days and at 50° C. for 4 days and, thereafter, No. 3 JIS dumbbells were punched out therefrom. They were subjected to tensile testing using a Shimadzu Corporation's autograph at a pulling rate of 200 mm/minute (23° C., 50% RH), and the 50% tensile modulus, 100% tensile modulus, strength at break (Tb) and elongation at break (Eb) were measured.

(Weather Resistance)

The curable composition was molded into a sheet-shaped test specimen with a thickness of about 3 mm, and the specimen was cured at 23° C. for 3 days and at 50° C. for 4 days, then fixed onto an aluminum plate and subjected to promoted weathering testing using a Suga Test Instruments' sunshine weatherometer (black panel temperature=63° C., water spraying time=18 minutes/120 minutes). The surfaces of test specimen were observed after irradiation for 500 hours, 1,000 hours, and 3,000 hours. The term "Fair" denotes that the surface retained its initial condition, and "Bad" denotes that cracks were found on the surface.

TABLE 1

| | | Example | | | | | | | |
|---|---|---|---|---|---|---|---|---|---|
| | | 1 | 2 | 3 | 4 | 5 | 6 | 7 | 8 |
| Material composition | Crosslinkable silyl group-containing vinyl polymer produced by living radical polymerization (polymer A) | 100 | | | | | | | |
| | Crosslinkable silyl group-containing vinyl polymer produced by living radical polymerization (polymer B) | | 50 | 50 | 50 | 50 | 50 | 50 | 50 |
| | Crosslinkable silyl group-containing polyoxyalkylene polymer (polymer C) | | 50 | 50 | 50 | 50 | 50 | 50 | |
| | MS polymer S943 | | | | | | | | 50 |
| | Aerosil RY200S | | 5 | | | | | | |
| | Aerosil R812 | 5 | | 5 | | 5 | | 5 | 5 |
| | Aerosil R972CF | | | | 5 | | | | |
| | Kane Ace FM-20 | | | | | | 5 | 5 | |
| | Diisodecyl phthalate (plasticizer) | 20 | 10 | 10 | 10 | | 20 | 20 | 10 |
| | Acrylic plasticizer | | | | | 10 | | | |
| | Ultraviolet absorber | 1 | 1 | 1 | 1 | 1 | 1 | 1 | 1 |
| | Light stabilizer | 1 | 1 | 1 | 1 | 1 | 1 | 1 | 1 |
| | Adhesive promoter | 2 | 2 | 2 | 2 | 2 | 2 | 2 | 2 |
| | Tin curing catalyst | 2 | 2 | 2 | 2 | 2 | 2 | 2 | 2 |
| Transparency of cured product | | Excellent | Fair | Fair | Excellent | Fair | Fair | Fair | Excellent |
| Adhesiveness to polycarbonate | | CF | CF | CF | CF | CF | CF | CF | CF |
| Viscosity | 2 rpm (Pa·s) | 270 | 170 | 70 | 106 | 84 | 228 | 245 | 204 |
| | 10 rpm (Pa·s) | 188 | 100 | 62 | 85 | 75 | 176 | 190 | 157 |
| Viscosity proportion (2 rpm/10 rpm) | | 1.44 | 1.70 | 1.13 | 1.25 | 1.12 | 1.30 | 1.29 | 1.30 |
| Workability | | Fair | Fair | Fair | Fair | Fair | Fair | Fair | Fair |
| Tensile property | 50% modulus (MPa) | 0.1 | 0.24 | 0.23 | 0.25 | 0.24 | 0.24 | 0.29 | 0.12 |
| | 100% modulus (MPa) | 0.3 | 0.40 | 0.39 | 0.42 | 0.42 | 0.43 | 0.47 | 0.23 |
| | Strength at break (MPa) | 0.4 | 0.68 | 0.90 | 0.79 | 0.68 | 0.74 | 0.95 | 0.62 |
| | Elongation at break (%) | 143 | 185 | 225 | 205 | 185 | 182 | 193 | 239 |
| Weather resistance | After 500-hours-irradiation by sunshine weatherometer | Fair | Fair | Fair | Fair | Fair | Fair | Fair | Fair |
| | After 1,000-hours-irradiation by sunshine weatherometer | Fair | Fair | Fair | Fair | Fair | Fair | Fair | Fair |
| | After 3,000-hours-irradiation by sunshine weatherometer | Fair | Fair | Fair | Fair | Fair | Fair | Fair | Fair |

| | | Comparative Example | | | |
|---|---|---|---|---|---|
| | | 1 | 2 | 3 | 4 |
| Material composition | Crosslinkable silyl group-containing vinyl polymer produced by living radical polymerization (polymer | 100 | | | |

TABLE 1-continued

|  |  |  |  |  |  |
|---|---|---|---|---|---|
| A) Crosslinkable silyl group-containing vinyl polymer produced by living radical polymerization (polymer B) | | 50 | | | |
| Crosslinkable silyl group-containing polyoxyalkylene polymer (polymer C) | | 50 | | | 100 |
| MS polymer S943 | | | 100 | | |
| Aerosil RY200S | | | | | 5 |
| Aerosil R812 | | | | 5 | |
| Aerosil R972CF | | | | | |
| Kane Ace FM-20 | | | | | |
| Diisodecyl phthalate (plasticizer) | | 10 | 10 | 10 | 10 |
| Acrylic plasticizer | | | | | |
| Ultraviolet absorber | | 1 | 1 | 1 | 1 |
| Light stabilizer | | 1 | 1 | 1 | 1 |
| Adhesive promoter | | 2 | 2 | 2 | 2 |
| Tin curing catalyst | | 2 | 2 | 2 | 2 |
| Transparency of cured product | | Excellent | Fair | Excellent | Poor |
| Adhesiveness to polycarbonate | | CF | CF | CF | CF |
| Viscosity | 2 rpm (Pa·s) | 92 | 24 | 158 | 146 |
|  | 10 rpm (Pa·s) | 92 | 23 | 130 | 80 |
| Viscosity proportion (2 rpm/10 rpm) | | 1.00 | 1.04 | 1.22 | 1.83 |
| Workability | | Bad | Bad | Fair | Fair |
| Tensile property | 50% modulus (MPa) | 0.09 | 0.17 | 0.18 | 0.39 |
|  | 100% modulus (MPa) | 0.15 | 0.28 | 0.30 | 0.62 |
|  | Strength at break (MPa) | 0.21 | 0.37 | 0.83 | 0.85 |
|  | Elongation at break (%) | 147 | 147 | 299 | 167 |
| Weather resistance | After 500-hours-irradiation by sunshine weatherometer | Fair | Fair | Fair | Bad |
|  | After 1,000-hours-irradiation by sunshine weatherometer | Fair | Fair | Bad | Bad |
|  | After 3,000-hours-irradiation by sunshine weatherometer | Fair | Fair | Bad | Bad |

The curable composition obtained in Example 1 was found to have good workability and the cured product obtained therefrom was found to be transparent and showed no surface deterioration even after 3,000-hour exposure in a weathering test and thus found to have good weather resistance. The curable compositions obtained in Examples 2 and 8 were found giving cured products having remarkably improved strength at break and elongation at break without deteriorating the transparency and weather resistance by using polyoxyalkylene copolymers in combination. On the other hand, the curable compositions obtained in Comparative Examples 1 and 2, which did not contain the micronized hydrophobic silica and the graft copolymer obtained by graft polymerization of a crosslinkable rubber-like acrylic ester polymer and a vinyl monomer, were found to have low ratio (viscosity proportion) of viscosity at 2 rpm and viscosity at 10 rpm. In the case of using them as a sealing material for jointing work, they could possibly drip and it is not desirable. Although the curable compositions obtained in Comparative Examples 3 and 4, which did not contain the crosslinkable silyl-containing vinyl polymer produced by living radical polymerization, were found to have good transparency and workability and good tensile properties of the cured products obtained therefrom, these compositions were inferior in the weather resistance of the cured products obtained therefrom and thus could not stand for long term use.

INDUSTRIAL APPLICABILITY

The curable composition of the invention may be prepared as a one package formulation, which can be cured by the reaction with the moisture in the air at room temperature, and is a transparent curable composition excellent in strength, elongation at break, weather resistance, and adhesiveness of the resultant cured product. Further, said curable composition can be suitably used as a transparent adhesive, sealing material and the like.

The invention claimed is:

1. A curable composition, which comprises
   100 parts by weight of a vinyl polymer (I) a main chain of which is a product of living radical polymerization, and which contains at least one crosslinkable silyl group, and
   1 to 50 parts by weight of a graft copolymer (III) obtained by graft polymerization of a crosslinkable rubber-like acrylic ester polymer and a vinyl monomer,
   wherein the curable composition is transparent and wherein the curable composition has a viscosity proportion of 1.1 or higher.

2. The curable composition according to claim 1 wherein the vinyl polymer (I) has a molecular weight distribution of less than 1.8.

3. The curable composition according to claim 1 wherein a vinyl monomer constituting the main chain of the vinyl polymer (I) is mainly selected from the group consisting of (meth)acrylic monomers, acrylonitrile monomers, aromatic vinyl monomers, fluorine-containing vinyl monomers and silicon-containing vinyl monomers.

4. The curable composition according to claim 1 wherein the main chain of the vinyl polymer (I) is a (meth)acrylic polymer.

5. The curable composition according to claim 1 wherein the main chain of the vinyl polymer (I) is an acrylic polymer.

6. The curable composition according to claim 5 wherein the main chain of the vinyl polymer (I) is an acrylic ester polymer.

7. The curable composition according to claim 1 wherein the living radical polymerization for producing the main chain of the vinyl polymer (I) is the atom transfer radical polymerization.

8. The curable composition according to claim 7 wherein a metal complex used as the catalyst in the atom transfer radical polymerization is a transition metal complex composed of a VII, VIII, IX, X, or XI group element in the periodic table as a central metal.

9. The curable composition according to claim 8 wherein the metal complex used as the catalyst is a complex composed of copper, nickel, ruthenium or iron as a central metal.

10. The curable composition according to claim 9 wherein the metal complex used as the catalyst is a complex of copper.

11. The curable composition according to claim 1 wherein the crosslinkable silyl group of the vinyl polymer (I) is represented by the general formula 1:

$$—[Si(R^1)_{2-b}(Y)_b O]_1—Si(R^2)_{3-a}(Y)_a \quad (1)$$

{wherein, $R^1$ and $R^2$ are the same or different and each is an alkyl group containing 1 to 20 carbon atoms, an aryl group containing 6 to 20 carbon atoms, an aralkyl group containing 7 to 20 carbon atoms or a triorganosiloxy group represented by $(R')_3 SiO—$ (in which R' represents a univalent hydrocarbon group containing 1 to 20 carbon atoms and the three R' groups may be the same or different) and, when there are two or more $R^1$ or $R^2$ groups, they may be the same or different; Y represents a hydroxyl group or a hydrolyzable group and, when there are two or more Y groups, they may be the same or different; a represents 0, 1, 2 or 3, b represents 0, 1 or 2, and 1 represents an integer of 0 to 19, provided that the relation $a +1b \geqq 1$ should be satisfied}.

12. The curable composition according to claim 1 wherein the crosslinkable silyl group of the vinyl polymer (I) is at the terminus of the main chain.

13. The curable composition according to claim 1 which further comprises a polyoxyalkylene polymer (IV) containing at least one crosslinkable silyl group in an amount within the range of 0.1 to 1,000 parts by weight per 100 parts by weight of the vinyl polymer (I).

14. The curable composition according to claim 1 which comprises no polyoxyalkylene polymer (IV) containing a crosslinkable silyl group(s).

15. The curable composition according to claim 1 which further comprises 0.1 to 20 parts by weight of a tin curing catalyst (V) per 100 parts by weight of the vinyl polymer (I).

16. An adhesive which comprises the curable composition according to claim 1.

\* \* \* \* \*